United States Patent
Maruyama

[11] Patent Number: 5,978,140
[45] Date of Patent: Nov. 2, 1999

[54] METHOD FOR DESIGNING DIFFRACTIVE LENSES

[75] Inventor: Koichi Maruyama, Tokyo, Japan

[73] Assignee: Asahi Kogaku Kogyo Kabushiki Kaisha, Tokyo, Japan

[21] Appl. No.: 08/956,197

[22] Filed: Oct. 22, 1997

[30] Foreign Application Priority Data

Oct. 24, 1996 [JP] Japan ................................... 8-300948

[51] Int. Cl.$^6$ .............................. G02B 27/44; G02B 5/18
[52] U.S. Cl. ......................... 359/569; 359/565; 359/570; 359/900
[58] Field of Search .................... 359/565, 569, 359/570, 9, 900

[56] References Cited

FOREIGN PATENT DOCUMENTS 6242373   9/1994   Japan .
8171052   7/1996   Japan .

OTHER PUBLICATIONS

Kinoform Lenses: Sweatt Model and phase Function, published on pp. 31–36 of teh May 5, 1995 issue of Optics Communications 117 (1995).

*Primary Examiner*—Cassandra Spyrou
*Assistant Examiner*—Jennifer Winstedt
*Attorney, Agent, or Firm*—Greenblum & Bernstein, P.L.C.

[57] ABSTRACT

The method for designing a diffractive lens to be formed on a refractive lens is disclosed. According to the method, a function of the diffractive lens is expressed as a polynomial optical path difference function using a height from an optical axis as a variable, a boundary of each zone to be formed is determined based on the optical path difference function, an angle of incidence of a ray on a macroscopic shape of the diffractive lens is determined, a shift, in a direction along the optical axis, corresponding to a unit wavelength of the optical path difference for each zone is determined based on the angle of incidence, an optical path difference to be given by each zone is determined based on the optical path difference function, and then a microscopic shape of each zone is determined.

19 Claims, 2 Drawing Sheets

METHOD FOR DESIGNING DIFFRACTIVE LENSES

BACKGROUND OF THE INVENTION

The present invention relates to a method for designing a diffractive lens to be formed on a surface of a refractive lens, and more particularly, to a generalized method for designing a diffractive-refractive hybrid lens on which rays may be incident obliquely with respect to an optical axes of the lenses.

There is conventionally known a lens formed with a circular zone structure, which functions as a diffractive lens, on a curved surface of a refractive lens in order to compensate for chromatic aberration with a single lens element. An example of a lens having such a structure is disclosed in Japanese Patent Provisional Publication No. HEI 6-242373, which discloses an objective lens for optical disk drive, and the diffractive lens structure described as above is formed on a surface thereof.

Further, Japanese Patent Provisional Publication No. HEI 8-171052 discloses a designing method employing a high refractive index method utilizing a Sweatt model. Then, based on the designed results, a diffractive lens is replaced with a thin film having a very high refractive index, and the lens is designed. According to this method, locations at which steps of circular zones to be formed, and an amount of the steps are determined. Further, sag amounts of the zones are determined as a sum of sag amounts of a surface of a refractive lens on which the diffractive lens is formed and sag amounts of the diffractive lens structure.

The objective lens disclosed in the Japanese Patent Provisional Publication No. HEI 6-242373 requires complicated calculations since aspherical surface coefficients are determined for each zone. The calculation disclosed in the Japanese Patent Provisional Publication No. HEI 8-171052 defines variations of a sag amount within one zone of a diffractive lens structure using an expression below:

$$s(z) = (r(z)^2 - H^2)^{1/2}$$

Since the above expression is an expression representing a spherical surface, this expression involves the following deficiencies.

(1) the expression involves a relatively large error if the diffractive lens structure includes a portion whose power is close to 0, i.e., a radius r of curvature of the portion is very great; and (2) since the structure is expressed with a quadratic function, only a limited optical performance of the diffractive lens is obtained.

Therefore, a lens structure obtained by the method may produce greater aberrations in comparison to the diffractive lens structure obtained by the method disclosed in the Japanese Patent Provisional Publication No. HEI 6-242373.

SUMMARY OF THE INVENTION

It is therefore an object of the invention to provide an improved method of designing diffractive lenses which is not so complicated as the method disclosed in the Japanese Patent Provisional Publication No. HEI 6-242373, and is capable of reducing aberrations due to limitation in expressions of the optical performance as compared with the method disclosed in the Japanese Patent Provisional Publication No. HEI 8-171052. The improved method can cope with not only a parallel incident light but also an obliquely incident light, and accordingly can determine a microscopic shape which maximizes a diffraction efficiency even if the lens receives light from a certain angle range (i.e., an angle of view).

According to an aspect of the invention, there is provided a method for designing diffractive lenses which comprises a step of expressing a function of a diffractive lens at a point on a lens surface as an optical path length addition amount for passing rays, determining a gradient of the surface from a macroscopic shape of the diffractive lens, determining cosine of an expected average angle of incidence of a light bundle to be incident on the point of the lens surface, determining a shift amount of a surface in a direction along an optical axis corresponding to a unit wavelength from the cosine of the average angle of incidence, determining an actual optical path difference to be given by the shift at the point in the direction along the optical axis on the basis of the optical path length addition amount and a step to determine a shift amount at the point on the lens surface on the basis of the shift amount in the direction along the optical axis on the basis of the shift amount in the direction along the optical axis corresponding to the unit wavelength and the optical path length difference.

From another aspect of the invention, there is provided a method for designing diffractive lenses to be formed on surfaces of refractive lenses according to the present invention is characterized in that it comprises a step to express a function of the diffractive lens as a polynomial optical path difference function using a height from an optical axis as a variable, a step to determine a switching point of a zone to be formed as a step on the basis of the optical path difference function, a step to determine an angle of incidence of a ray for each zone from a macroscopic shape of the diffractive lens, a step to determine a shift in the direction along the optical axis corresponding to the unit wavelength of the optical path difference for each zone on the basis of the angle of incidence, a step to determine an optical path difference to be given on each zone on the basis of the optical path difference function, and a step to determined a microscopic shape of each zone on the basis of the shift in the direction along the optical axis and the optical path difference.

DESCRIPTION OF THE EMBODIMENTS

Now, description will be made of embodiments according to the method for designing diffractive lenses.

First, a structure of a refractive-diffractive hybrid lens according to the invention will be described. The refractive-diffractive hybrid lens is a lens having a diffractive lens that is formed on a surface of refractive lens.

Figure 2:
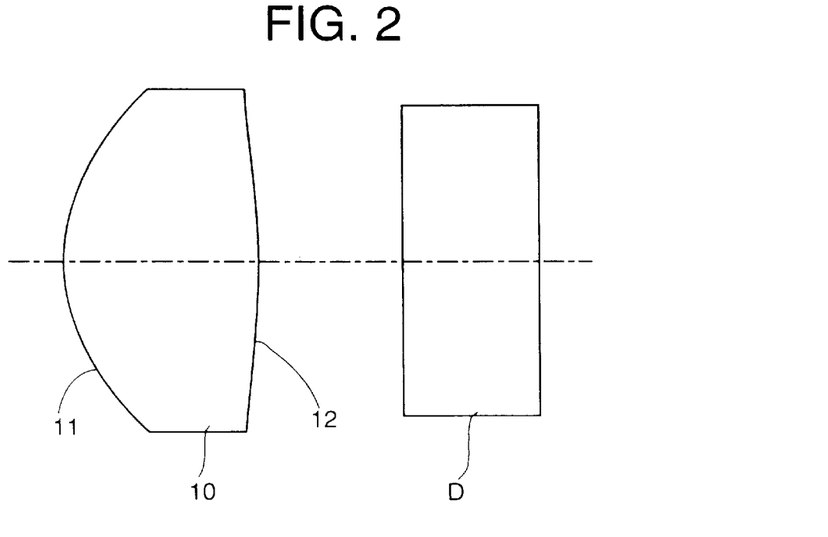
FIG. 2 is a sectional view illustrating an objective lens preferred as a first embodiment of the present invention.

The method according to the present invention is applicable to a lens which has a certain angle of view (i.e., in a case where rays may be incident obliquely with respect to an optical axis thereof). In the description below, firstly, reference will be made to an objective lens for an optical disk D (FIG. 2), wherein incident rays can be regarded as parallel rays with respect to an optical axis thereof. Then, description will be made of a general lens, for example, a condenser lens which receives obliquely incident rays and forms an image on a light receiving device such as a CCD.

Figure 1A:
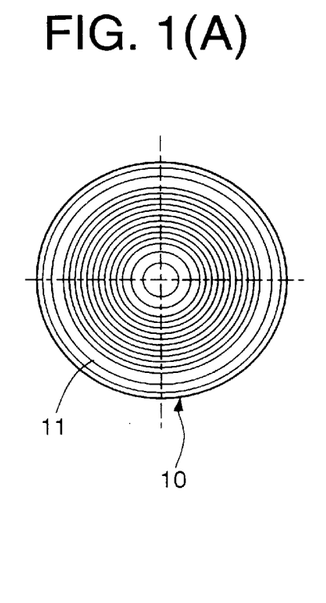
FIGS. 1(A) through 1(C) are diagrams descriptive of a refractive-diffractive hybrid lens to which the design method according to the present invention is applied.
Figure 1B:
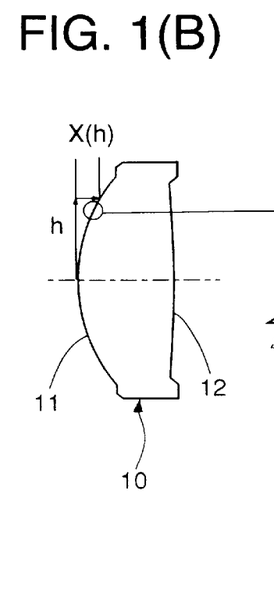

FIGS. 1(A) and 1(B) are diagrams illustrating a refractive-diffractive hybrid lens 10 to which the method according to the present invention is applied. The lens 10 is, for example, a condenser lens which may be used for forming an image on a light receiving device. Alternatively, the lens 10 may be a positive lens which is used as an objective lens of a pickup device for an optical disk device.

Figure 1C:
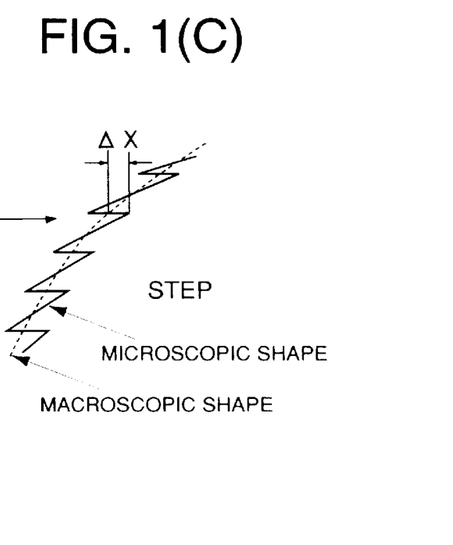

FIG. 1(A) is a front view of the lens 10, FIG. 1(B) is a side view showing a macroscopic shape of the lens 10, and FIG. 1(C) is a partially enlarged side view illustrating a microscopic shape of the lens 10.

The lens 10 is macroscopically a biconvex lens element having two aspherical surfaces 11 and 12. A radius of curvature of each of the surfaces 11 and 12 is longer at peripheral portion (i.e., a portion far from the optical axis), and shorter at the central portion (i.e., a portion close to the optical axis) thereof. As shown in FIG. 1(A), a diffractive lens having a plurality of circular zones concentric around the optical axis of the lens 10 is formed on the surface 11 of the lens 10. Similar to a Fresnel lens, the diffractive lens has steps, in a direction along an optical axis, at boundaries between the circular zones. Heights of the steps in a direction parallel to the optical axis are determined depending on orders and wavelengths of rays to be diffracted. Since it has recently become possible to form a diffractive lens on a curved surface, it is not necessary to form one of the surfaces of the lens 10 as a planar surface in order for forming the diffractive lens, and the lens 10 is formed to be macroscopically the biconvex lens element in the present embodiment. In the lens 10 shown in FIGS. 1(A) through 1(C), the diffractive lens is formed on the surface 11 (i.e., on the left-hand side of the drawing) on which a parallel light is incident.

A method for designing a diffractive lens described above will be described. The method according to the embodiment is a method for designing a Fresnel lens type diffractive lens to be formed on a curved surface. Specifically, an actual shape, or a physical shape of the diffractive lens is obtained based on a macroscopic shape determined by a phase function method, and an optical path difference function. Alternatively, the physical shape of the diffractive lens is obtained based on a macroscopic shape of a thin film layer having a high refractive index, which is substituted for the diffractive lens, using the Sweatt model and a refractive index of the actual material forming the diffractive lens structure.

For designing diffractive-refractive hybrid lenses, and particularly for designing macroscopic shapes and powers of diffractive lenses separately, various methods have been developed. One of the typical methods is the high refractive index method which utilizes the Sweatt model, and another typical method is the phase function method.

The high refractive index method is a method in which a refractive power of a diffraction lens is calculated by replacing a power of the diffraction lens with a thin film-like refractive lens representing a macroscopic shape of the diffractive lens. This method is referred to also as a ultra-high index method, and gives a remarkably high refractive index to the thin film since a diffractive power is replaced with a refractive power. By using the Sweatt model, it is possible to use an existing lens design program, which deals with the refractive lenses, in order to deal with a diffractive lens.

When the diffractive lens is designed in accordance with the ultra-high index method using the Sweatt model, the optical path difference function is obtained during a process of determining a final shape.

When the diffractive lens is designed in accordance with the phase function method, the macroscopic shape of the diffractive lens and the optical path difference are obtained upon completion of a design for correction of aberrations.

In the following description, design processes according to the ultra-high index method using the Sweatt model will be described.

Designing of a diffractive lens using the Sweatt model has conventionally been known as afore-mentioned, and is disclosed, for example, in the Japanese Patent Provisional Publication No. HEI 8-171052. However, data obtained by such a conventional method represents a macroscopic shape of both surfaces of the thin film lens, and it is difficult to judge, only from the data obtained in the conventional method, what pitches and steps of zones are required for forming the actual zones on the curved surface of the refractive lens. This embodiment shows procedures to convert the shape of the thin film lens obtained using the Sweatt model into the actual shape of the diffractive lens which has a group of circular stepped zones.

First, a brief description regarding a design of the diffractive lens using the Sweatt model will be provided.

In tracing rays for designing a diffractive lens by the ultra-high index method using the Sweatt model, it is desirable that a refractive index of a thin film substituting for a diffractive lens is as high as possible. Practically, however, it is necessary to set a refractive index in view of a balance between: (a) reduction of a number of effective digits due to a limit of a calculation accuracy of a software to be used; and (b) a simulation error due to a limited value of a refractive index of the thin film to be used in a model. In practice, a refractive index of a thin film is set, for example, within a range from 500 to 1,000,000, depending on accuracy of the used programs.

It is preferable that the refractive index n is defined as a function of a wavelength of light to be used, and is defined as:

$$n(\lambda)=\lambda \times C+1,$$

where, C represents a constant. When the refractive index is defined as above, a shift amount of an optical path difference, in a unit of wavelength, due to variations in thickness of the thin film becomes constant independently of the wavelength. For easy understanding of calculation, it is further preferable that the refractive index is defined as:

$$n(\lambda)=\lambda \times 10^m+1,$$

where, m can be an any number as far as the calculated refractive index n is within a range described above (i.e., 500–1,000,000).

When a wavelength 587.56 nm of the d-line is selected as a blazed wavelength $\lambda$, and m is set to 6, for example, the thin film has a refractive index of 588.56 and a shift amount of the optical path difference per one nanometer of thin film thickness is $1\lambda$.

If the function is set as described above, it is easy for a designer to understand correspondence between the refractive indices and wavelengths, and thickness in a direction perpendicular to a surface of a thin film layer and the shift amount of the optical path length is expressed as a simple relationship.

The value "1" used in the formula represents a refractive index of air, and it means that a portion expressed as the thin film is replaced with air when an actual zone structure is formed, i.e., the zone structure is formed on a boundary surface between the thin film and the lens.

If the portion expressed as the thin film is to be filled with a lens material for forming the zone structure, i.e., when a zone structure is to be formed on a boundary surface between the thin film and air, the refractive index of the lens, for example "1.5", is used in place of "1" in the formula indicated above. Such a difference between the constants affects a result when a refractive index is set at a relatively low level, but may not affect a calculation result when the refractive index of the thin film is set at 10,000 or higher.

When a diffractive lens is designed using the Sweatt model, the designer first determines a surface of a refractive lens on which the diffractive lens is formed. When the designer determines the surface, consideration should be made on a kind of aberration to be corrected by the diffractive lens, and working facility. Conventionally, diffraction gratings are formed on planar surfaces. Recently, however, it has become possible to form the diffraction gratings, using super precise lathes, on spherical and/or aspherical surfaces as well as the planar surfaces. In this embodiment, as described before, the diffractive lens is formed on a curved surface.

Since the diffractive lens is express[]d as the thin film in the design using the Sweatt model, the microscopic shape and a power of the diffractive lens are not obtained directly. Therefore, firstly, the optical path difference function is created based on the thin film data which is obtained using the Sweatt model, and then, based on the optical path difference function, the actual diffractive lens structure is obtained.

The optical path difference function expresses a difference between an optical path of a ray passing through the thin film and an optical path of a ray when the thin film would not exist, as a function of a distance h which is a distance of a point at which the ray is incident on the thin film with respect to the optical axis. In the Sweatt model, a difference between an optical path length of the ray traveling through the thin film and an optical path length of the ray traveling when the thin film would not exist is defined as a skip value (i.e., an additional amount) of an optical path length of the diffractive lens. Accordingly, the skip value for the optical path length must be determined for creating the optical path difference function. It should be noted that in an optical system which is rotationally symmetrical with regard to the optical axis, a point on a lens may be expressed only by the distance (which is also referred to as a height) h from the optical axis, and in such an optical system, the optical path difference can also be expressed as a function of the distance h.

A ray which is incident on the thin film at an angle of incidence $\theta 0$ from another medium such as air or a lens which has a refractive index $n0$ travels through the thin film at an angle of refraction $\theta 1$ according to the law of refraction, "$n0 \times \sin \theta 0 = n1 \times \sin \theta 1$". In the Sweatt model, however, the angle of refraction $\theta 1$ is approximately 0 degree regardless of the angle of incidence $\theta 0$ since the refractive index $n1$ of the thin film is remarkably high in comparison to the refractive index $n0$ of the other medium. In other words, rays incident on the thin film at any angles travel through the thin film substantially along a normal line to the point of incidence. It is therefore possible to obtain the optical path difference function by determining thickness of the thin film at each point in a direction along the normal line to the surface on which rays are incident. Practically, an optical path difference function can be obtained by calculating thicknesses of the thin film at about 10 points located at different distances h from the optical axis, and a polynomial approximation is executed based on the calculated thicknesses.

In the design using the Sweatt model, optical path difference components having higher order than the order of a function defining the surface which is used in the design process are produced if the surface of the refractive lens on which the diffractive lens structure is to be formed is a curved surface. Accordingly, the optical path difference function based on the Sweatt model cannot be approximated sufficiently with the quadratic function. It is desirable to approximate the optical path difference function with at least a fourth-order function or, if possible, an eighth-order function to obtain sufficient accuracy.

Approximation errors of the optical path difference function directly result in wave front aberrations. It is considered that wave front errors on the order of $0.01\lambda$ are allowable for most of the optical systems. In case of lens data listed in Tables 1 and 2, a maximum error was reduced to $\frac{1}{1000}\lambda$ by development of the function up to the eighth order, and accordingly sufficient accuracy is obtained if the eighth-order function is used. Development of the function up to the sixth order produces a maximum error of $0.02\lambda$. Development to the sixth order is required in order to obtain sufficient accuracy for forming the microscopic structure of the objective lens for the pickup of optical disk devices, and development to the fourth order is insufficient in terms of accuracy. A second-order term P2 of the optical path difference function and the focal length fD of the diffractive lens satisfy the following relationship:

$$fD = -1/(2 \times P2 \times \lambda)$$

where, the reference symbol $\lambda$ represents the wavelength.

After the optical path difference function is determined, a distance from the optical axis to a boundary between each zone is determined based on the optical path difference function. It may be possible to define the boundary as a location at which an optical path length for the ray transmitting through a thin film is an integral multiple of a wavelength as disclosed in the Japanese Patent Provisional Publication mentioned above. Alternatively, the boundary point may be defined more generally as a position where a remainder that is obtained by dividing the optical path length by a wavelength is coincident with $\alpha$ considering that the optical path length is $2n\pi + \alpha$ (0 rad. $<\alpha<2\pi$ rad.).

When the diffractive lens structure is to be formed on the curved surface, the optical path difference function has the terms of high orders as described above, and therefore calculation is complicated when the optical path difference function is used as it is. In particular, when the optical path difference function is defined by the eighth-order function or tenth-order function, it is difficult to solve the formula and set the optical path difference to an integral multiple of the wavelength.

On the other hand, locations of steps of the diffractive lens are important since they determine a power of the diffractive lens, but errors in locations of steps do not directly result in wavefront aberrations. Errors in locations of the steps result only in a slight variation of a balance between burdens on the diffractive component and the refractive component of the power of the lens. This means that the errors in locations of the steps give no influence on the lens at the blazed wavelength, but vary characteristics of variation of spherical aberration depending on the wavelength in an optical system using light having a certain wavelength range. It is therefore sufficient to determine locations of steps in accordance with the optical path difference function up to the fourth order when variations of chromatic aberration of spherical aberration are to be corrected by correcting at the order of the fourth order expressed in a wave front aberration, or a so-called third-order spherical aberration.

In the embodiment, the optical path difference function is expressed as the fourth-order function, containing second-order terms and fourth-order terms, for determining the boundary of the zones, and the distance h of each boundary is determined by solving a biquadratic equation. Factors which cannot be expressed by the fourth-order function and to be expressed by higher-order terms such as sixth and/or eighth order terms are taken into consideration when an actual shape of each zone is determined, and then a position thereof in the direction of the optical axis is determined.

Since a solution of the biquadratic equation consisting of the second-order terms and the fourth-order terms can be obtained according to the formula for solving quadratic equations, the boundary location can be obtained relatively easily. That is, it is possible to reduce the burdens on calculations by determining optical path difference functions of different orders and selectively using these functions for respective calculations. For example, for determining a boundary of a circular zone, by using the fourth-order optical path difference function, calculations can be made easier; and for determining a location of each zone in the direction along the optical axis, the eighth-order optical path difference function is to be used. Terms of higher orders are to be taken into consideration when variations of spherical aberration due to chromatic aberration, which corresponds to the wavefront aberration of the sixth and higher orders.

Thus, the fourth-order function, which facilitates the calculations, is used for determining the locations of the boundaries of the zones, and the eighth-order function is used as the optical path difference function when the microscopic structure of the diffractive lens is to be determined. Alternatively, the optical path difference functions of different orders may be selectively used for design when a surface of each zone is designed separately from a method using the optical path difference function, and when the boundary points are determined, phases thereof are adjusted. Optionally, if the diffractive lens can be designed without considering diffraction effects of high orders, by using the ultra-high index method, it is possible to set the terms of high orders of an optical path difference function to have negligible small values by introducing an aspherical surface of high orders in design data.

Then, a zone structure like a Fresnel lens is designed by replacing the highly refractive thin film having the diffractive structure with a medium having an actual refractive index. In the medium having the actual refractive index, since the index is relatively low, incident rays do not travel in a direction along a normal line unlike the description with reference to the thin film, but travel in directions dependent on angles of incidence. Accordingly, optical path differences differ depending on the angles of incidence, and it is necessary to determine a shape of a zone taking diffraction efficiencies of offaxial rays into consideration when angles of incidence cannot be specified as one. Further, if an incident light flux has a wavelength range, it is necessary to take into consideration variations of diffraction efficiencies due to variation of wavelengths.

Although angles of incidence of rays on a macroscopic shape of the diffractive lens structure have been determined, angles of incidence on zones are different from the angles of incidence on the macroscopic shape since actual shape of zones are different from the macroscopic shape as shown in FIG. 1(C). It is desirable to design zones with taking the variations of the angles of incidence into consideration for an accurate design. However, since a difference in angles of incidence between the macroscopic shape and a microscopic shape is on the order of 2 degrees, only a small influence is produced even when the difference exists. Accordingly, if the zones are designed for correcting chromatic aberration, the difference between the angles of incidence on the zones and those on the macroscopic shape may be ignored. When the differences in angles of incidence are expected to be relatively large and may not be negligible, it is possible to determine a microscopic structure by newly determining angles of incidence on a temporal shape that is determined on the basis of the macroscopic shape.

Now, the method for designing refractive lenses according to the present invention will be described in further detail with reference to exemplary lens structures.

Firstly, a case in which rays incident on a lens are considered to be parallel with an optical axis thereof. The lens according to the first embodiment is an objective lens for optical disk drives which is a diffractive-refractive hybrid lens. The objective lens according to the first embodiment is a plastic lens having two aspherical surfaces and a diffractive lens is formed on one of the aspherical surfaces on which a parallel light flux is incident.

Numerical data representing a macroscopic shape of the first embodiment is indicated in Table 1. In this table, a thin film (thin film having a high refractive index) corresponding to a diffractive lens portion represented by a ultra-high index is disposed between a first surface and a second surface. A refractive lens made of a plastic material is disposed between the second surface and a third surface. A fourth surface and a fifth surface are protective layers for an optical disk. In the table, a reference symbol NA represents a numerical aperture of the objective lens, a reference symbol f designates a focal length of an entire optical system at a wavelength of 780 nm. A reference symbol r denotes a radius of curvature (unit: mm) of each surface at an intersection with an optical axis, and a reference symbol d represents a distance (unit: mm) between surfaces. Reference symbols n780 and n830 designate refractive indices at wavelengths of 780 nm and n830 nm, respectively. Conical coefficients K and aspherical surface coefficients A4, A6, A8 and A10 (the fourth, sixth, eighth and tenth orders) for defining the first through third surfaces, which are aspherical surfaces, are indicated in Table 2.

TABLE 1

| f = 3.003 | NA = 0.55 | | | |
|---|---|---|---|---|
| Surface No. | r | d | n780 | n830 |
| 1 | 1.987959 | 0.000 | 781.000 | 831.000 |
| 2 | 1.9880000 | 1.720 | 1.53677 | 1.53560 |
| 3 | −6.7530000 | 1.300 | | |
| 4 | ∞ | 1.200 | 1.57346 | 1.57167 |
| 5 | ∞ | | | |

TABLE 2

| First surface | K = −0.5100 | A4 = −5.6295 × 10⁻⁵ | A6 = −1.8850 × 10⁻⁴ |
|---|---|---|---|
| | | A8 = 6.1500 × 10⁻⁵ | A10 = −6.8400 × 10⁻⁵ |
| Second surface | K = −0.5100 | A4 = −5.6800 × 10⁻⁵ | A6 = −1.8850 × 10⁻⁴ |
| | | A8 = 6.1500 × 10⁻⁵ | A10 = −6.8400 × 10⁻⁵ |
| Third surface | K = 0.0000 | A4 = 1.6510 × 10⁻² | A6 = −4.4810 × 10⁻³ |
| | | A8 = 4.8930 × 10⁻⁴ | A10 = −8.8000 × 10⁻⁵ |
| Focal length of diffractive lens | | f doe = −1/(2λP2) = 120.465 | |
| Focal length of refractive lens | | f ref = r/(n' − n) = 3.704 | |

After completing the design with the Sweatt model as described above, the optical path difference function is determined as a polynomial formula on the basis of data of the thin film. Then, heights of steps of zones from the optical axis are determined utilizing the polynomial formula, and heights of the zones in a direction along the optical axis are determined using an approximation formula. The optical path difference function can be determined by sampling, at several points on the thin film, additional amounts for optical path lengths for rays passing through the thin film that is designed with the Sweatt model, and approximating based on the sampled value. An approximation formula of the fourth-order formula 1 for determining heights of steps from the optical axis and an approximation formula of the tenth-order formula 2 for determining heights in the zones in the direction along the optical axis are defined in this embodiment.

$$\phi_4 = P_2 \times h^2 + P_4 \times h^4 \tag{1}$$

$$\phi_{10} = P_2 \times h^2 + P_4 \times h^4 + P_6 \times h^6 + P_8 \times h^8 + P_{10} \times h^{10} \tag{2}$$

For determining additional amounts for the optical path length based on the thin film having a high refractive index, if a function of a conventional diffraction grating formed on a planar surface is to be considered, it is sufficient to determine optical path differences given by the thin film as distances in a direction parallel to the optical axis at any position. In the present embodiment, however, a diffraction grating is supposed to be formed on a curved surface, and accordingly, it is necessary to obtain an intersection between a ray and the surface by tracing the ray, and to calculate an optical path length. When the thin film has an extremely high refractive index as described above, an angle of refraction is nearly 0 independently of an angle of incidence and a refracted ray travels substantially along a normal to a point of incidence on the surface. Therefore, the additional amount of the optical path length for a ray incident on the thin film can be approximated to a value obtained by dividing thickness of the thin film in the direction along the optical axis by direction cosine in the y direction of a normal line on the point of incidence on a surface of the thin film on which the ray is incident. This approximation permits reducing an amount of calculations.

TABLE 3

| | Developed with formula of fourth order | Developed with formula of tenth order |
|---|---|---|
| P2 | −5.3213 | −5.3213 |
| P4 | −3.1124 × 10⁻¹ | −3.2194 × 10⁻¹ |
| P6 | | 1.6828 × 10⁻² |
| P8 | | 1.0792 × 10⁻² |
| P10 | | −6.0986 × 10⁻³ |

First, a boundary point of a zone is determined. For the objective lens according to the present embodiment, the boundary point of the zone is determined on the basis of an optical path difference function φ4 developed with a formula of the fourth order for correcting variations of spherical aberration due to variation of the wavelength. Table 4 shown below indicates heights of each zone, i.e., a height hi(N), from the optical axis, of end of an N-th zone as counted from the center, a height hc(N) of a middle point of the zone from the optical axis, and a height ho(N) of an end on a most marginal side of the zone from the optical axis.

These values are calculated according to formulae 3, 4 and 5.

$$hi(N) = \sqrt{\frac{-P_2 - \sqrt{P_2^2 - 4P_4 \times (N - 0.5)}}{2P_4}} \tag{3}$$

$$hc(N) = \sqrt{\frac{-P_2 - \sqrt{P_2^2 - 4P_4 \times N}}{2P_4}} \tag{4}$$

$$ho(N) = \sqrt{\frac{-P_2 - \sqrt{P_2^2 - 4P_4 \times (N + 0.5)}}{2P_4}} \tag{5}$$

In a case where a diffractive lens is designed in accordance with the phase function method and has no optical path difference function of a high order, or in a case where wavelength variations of spherical aberration may not be corrected, a switching location of a zone can be determined by a quadratic function.

TABLE 4

Height h (mm) of N-th zone as measured from optical axis

| Zone No. N | hi (N) | hc (N) | ho (N) |
|---|---|---|---|
| 0 | | 0 | 0.3057 |
| 1 | 0.3057 | 0.4312 | 0.5267 |
| 2 | 0.5267 | 0.6066 | 0.6764 |
| 3 | 0.6764 | 0.7391 | 0.7964 |
| 4 | 0.7964 | 0.8493 | 0.8986 |
| 5 | 0.8986 | 0.9450 | 0.9888 |
| 6 | 0.9888 | 1.0304 | 1.0700 |
| 7 | 1.0700 | 1.1079 | 1.1442 |
| 8 | 1.1442 | 1.1791 | 1.2128 |
| 9 | 1.2128 | 1.2453 | 1.2767 |
| 10 | 1.2767 | 1.3071 | 1.3366 |
| 11 | 1.3366 | 1.3653 | 1.3931 |
| 12 | 1.3931 | 1.4203 | 1.4467 |
| 13 | 1.4467 | 1.4724 | 1.4976 |
| 14 | 1.4976 | 1.5222 | 1.5462 |
| 15 | 1.5462 | 1.5697 | 1.5926 |
| 16 | 1.5926 | 1.6152 | 1.6372 |
| 17 | 1.6372 | 1.6589 | 1.6801 |
| 18 | 1.6801 | 1.7009 | 1.7214 |

Then, a macroscopic shape of a boundary surface between the thin film and the refractive lens which is defined by aspherical surface coefficients is determined for the central side end, the middle portion, and the peripheral side end. The macroscopic shape is calculated according to formula 6.

$$X(h, N) = \frac{h^2}{r \times \left(1 + \sqrt{\frac{1-(1+K)\times h^2}{r^2}}\right)} + A_4 h^4 + A_6 h^6 + A_8 h^8 + A_{10} h^{10} \quad (6)$$

where, X is a sag amount with respect to a tangential plane, h is a distance from an optical axis of said diffractive lens, N represents a zone number counted from a zone on a central side, r represents a macroscopic radius, K represents a conical coefficient, A4, A6, A8 and A10 respectively represent 4th-order, 6th-order, 8th-order and 10th-order aspherical surface coefficients.

Calculation results are listed in Table 5, and the macroscopic shape is defined as a continuous rotationally symmetrical surface having no steps.

TABLE 5

| Zone No. N | X (mm) of macroscopic shape formula | | |
|---|---|---|---|
| | Xi (N) | Xc (N) | Xo (N) |
| 0 | | 0 | 0.023572 |
| 1 | 0.023572 | 0.047026 | 0.070368 |
| 2 | 0.070368 | 0.093602 | 0.116734 |
| 3 | 0.116734 | 0.139767 | 0.162707 |
| 4 | 0.162707 | 0.185557 | 0.208321 |
| 5 | 0.208321 | 0.231001 | 0.253601 |
| 6 | 0.253601 | 0.276122 | 0.298569 |
| 7 | 0.298569 | 0.320941 | 0.343240 |
| 8 | 0.343240 | 0.365468 | 0.387625 |
| 9 | 0.387625 | 0.409711 | 0.431727 |
| 10 | 0.431727 | 0.453671 | 0.475544 |
| 11 | 0.475544 | 0.497344 | 0.519069 |
| 12 | 0.519069 | 0.540719 | 0.562290 |
| 13 | 0.562290 | 0.583781 | 0.605188 |
| 14 | 0.605188 | 0.626509 | 0.647741 |
| 15 | 0.647741 | 0.668880 | 0.689922 |
| 16 | 0.689922 | 0.710863 | 0.731699 |
| 17 | 0.731699 | 0.752425 | 0.773036 |
| 18 | 0.773036 | 0.793527 | 0.813893 |

Next, an angle of incidence of a ray on each zone is determined from the macroscopic shape.

A first differential value dXo(N)/dh is calculated by differentiating the macroscopic shape with respect to the height h. On the basis of this value, a component L, in the direction along the optical axis, of the direction cosine is determined according to formula 7, and an angle α (rad.) of surface, relative to the optical axis, defined by the macroscopic shape is determined using formula 8.

$$L = \frac{1}{\sqrt{1 + (d\,Xo(N)/d\,h^2)}} \quad (7)$$

$$\alpha = \tan^{-1}\left(\frac{d\,Xo(N)}{d\,h}\right) \quad (8)$$

Since incident rays are substantially only parallel rays which are adjusted so as to be in parallel with the optical axis in this embodiment, an angle W formed between the incident ray and the optical axis is 0 rad. at a point having any height on the lens. Accordingly, an angle of incidence θ (rad.) at each point which is determined by w-α is as indicated in Table 6. Since an actual shape of the diffractive lens surface is not determined at this stage, angle θ is calculated based on the macroscopic shape. Values at the peripheral side end of each zone is indicated Table 6.

TABLE 6

| Zone No. N | First differential dXo/dh | Direction cosine L | Angle of surface α (rad.) | Angle of incidence θ (rad.) |
|---|---|---|---|---|
| 0 | 0.1547 | 0.9883 | 0.1534 | −0.1534 |
| 1 | 0.2695 | 0.9655 | 0.2633 | −0.2633 |
| 2 | 0.3501 | 0.9438 | 0.3368 | −0.3368 |
| 3 | 0.4169 | 0.9230 | 0.3950 | −0.3950 |
| 4 | 0.4756 | 0.9030 | 0.4440 | −0.4440 |
| 5 | 0.5291 | 0.8839 | 0.4867 | −0.4867 |
| 6 | 0.5787 | 0.8655 | 0.5246 | −0.5426 |
| 7 | 0.6253 | 0.8479 | 0.5588 | −0.5588 |
| 8 | 0.6693 | 0.8310 | 0.5898 | −0.5898 |
| 9 | 0.7112 | 0.8149 | 0.6182 | −0.6182 |
| 10 | 0.7511 | 0.7996 | 0.6442 | −0.6442 |
| 11 | 0.7891 | 0.7850 | 0.6681 | −0.6681 |
| 12 | 0.8253 | 0.7712 | 0.6900 | −0.6900 |
| 13 | 0.8597 | 0.7583 | 0.7101 | −0.7101 |
| 14 | 0.8922 | 0.7462 | 0.7285 | −0.7285 |
| 15 | 0.9228 | 0.7349 | 0.7453 | −0.7453 |
| 16 | 0.9513 | 0.7245 | 0.7604 | −0.7604 |
| 17 | 0.9776 | 0.7151 | 0.7741 | −0.7741 |
| 18 | 1.0017 | 0.7065 | 0.7862 | −0.7862 |

Based on the angle of incidence θ indicated above, its cosine is determined and cosine of an angle of refraction is calculated using the refractive index of an actual material. Then, on the basis of the calculated values, thickness Δt which gives an optical path difference corresponding to 1λ in the direction along the normal is calculated according to formula 9.

$$\Delta t = \frac{\lambda}{n_0 \cos\theta_0 - n_1 \cos\theta_1} \quad (9)$$

In formula 9, the reference symbol n0 represents a refractive index of a medium on an incidence side of the diffractive lens surface and a reference symbol n1 represents a refractive index of a medium on an emerging side. In order to convert thus obtained step into a step ΔX in a direction parallel to the optical axis, ΔX is expressed as Δt/cos α, wherein α represents an angle formed between the optical axis and the normal to the surface. It should be noted that, in this embodiment, since the flux of light is parallel to the optical axis of the optical system, cos α=cos θ. Results of these calculations are indicated in Table 7.

TABLE 7

| Zone No. N | cos θ | cos θ' | Δt | ΔX |
|---|---|---|---|---|
| 0 | 0.9883 | 0.9950 | −0.0014420 | −0.0014592 |
| 1 | 0.9655 | 0.9856 | −0.0014207 | −0.0014714 |
| 2 | 0.9438 | 0.9766 | −0.0014004 | −0.0014837 |
| 3 | 0.9230 | 0.9681 | −0.0013810 | −0.0014962 |
| 4 | 0.9030 | 0.9601 | −0.0013625 | −0.0015088 |
| 5 | 0.8839 | 0.9526 | −0.0013449 | −0.0015215 |
| 6 | 0.8655 | 0.9454 | −0.0013280 | −0.0015344 |
| 7 | 0.8479 | 0.9386 | −0.0013120 | −0.0015473 |
| 8 | 0.8310 | 0.9322 | −0.0012967 | −0.0015603 |
| 9 | 0.8149 | 0.9262 | −0.0012821 | −0.0015733 |
| 10 | 0.7996 | 0.9205 | −0.0012683 | −0.0015862 |
| 11 | 0.7850 | 0.9152 | −0.0012553 | −0.0015991 |
| 12 | 0.7712 | 0.9102 | −0.0012430 | −0.0016117 |
| 13 | 0.7583 | 0.9056 | −0.0012315 | −0.0016241 |
| 14 | 0.7462 | 0.9013 | −0.0012208 | −0.0016361 |
| 15 | 0.7389 | 0.8974 | −0.0012109 | −0.0016477 |
| 16 | 0.7245 | 0.8938 | −0.0012018 | −0.0016588 |

TABLE 7-continued

| Zone No. N | cos θ | cos θ' | Δt | ΔX |
|---|---|---|---|---|
| 17 | 0.7151 | 0.8905 | −0.0011936 | −0.0016692 |
| 18 | 0.7065 | 0.8877 | −0.0011861 | −0.0016788 |

Note that $\phi c(N)$ is a calculation result obtained when a distance from an optical axis to the middle portion of each zone determined by the forth-order optical path difference function $\phi 4$ is substituted in the tenth-order optical path difference function $\phi 10$. Table 8 indicates optical path length differences: optical path lengths when a thin film having a high refractive index is provided in accordance with a Sweatt model and optical path lengths when the thin film is not provided, in a unit of wavelength $\lambda$. The optical path length differences $\phi i(N)-N$, $\phi c(N)-N$ and $\phi o(N)-N$ are obtained by subtracting integral multiple of wavelengths from the results calculated by substituting distances from the optical axis to the central side end, the middle portion, and the peripheral side end in the tenth-order optical path difference function $\phi 10$, respectively. The optical path length differences $\phi i(N)-N$, $\phi c(N)-N$ and $\phi o(N)-N$ indicate optical path difference amounts to be added by a microscopic structure to the macroscopic shapes of the central end point, the middle portion, and the peripheral end point of each zone when the thin film expressed by the continuous optical path difference function $\phi 10$ is divided into a plurality of zones similar to a Fresnel lens structure by forming steps at the locations determined by the fourth-order optical path difference function $\phi 4$.

The optical path length differences which are to form the microscopic shapes would not have fine effective numerals such as those indicated in Table 8, if locations at which the optical path length differences have fractions of $0.5\lambda$, without creating an approximation function for determining boundary heights of zones from the sampling points. However, such an attempt will increase a calculation amount and not be practical.

TABLE 8

| Zone No. N | φc (N) | φi (N) − N | φc (N) − N | φo (N) − N |
|---|---|---|---|---|
| 0 | 0 |  | 0 | −0.5001 |
| 1 | −1.0003 | 0.4999 | −0.0003 | −0.5004 |
| 2 | −2.0005 | 0.4996 | −0.0005 | −0.5003 |
| 3 | −2.9998 | 0.4997 | 0.0002 | −0.4989 |
| 4 | −3.9975 | 0.5011 | 0.0025 | −0.4956 |
| 5 | −4.9931 | 0.5044 | 0.0069 | −0.4901 |
| 6 | −5.9864 | 0.5099 | 0.0136 | −0.4822 |
| 7 | −6.9775 | 0.5178 | 0.0225 | −0.4723 |
| 8 | −7.9668 | 0.5277 | 0.0332 | −0.4611 |
| 9 | −8.9553 | 0.5389 | 0.0447 | −0.4495 |
| 10 | −9.9441 | 0.5505 | 0.0559 | −0.4392 |
| 11 | −10.9351 | 0.5608 | 0.0649 | −0.4321 |
| 12 | −11.9304 | 0.5679 | 0.0696 | −0.4304 |
| 13 | −12.9325 | 0.5696 | 0.0675 | −0.4370 |
| 14 | −13.9443 | 0.5630 | 0.0557 | −0.4549 |
| 15 | −14.9693 | 0.5451 | 0.0307 | −0.4878 |
| 16 | −16.0111 | 0.5122 | −0.0111 | −0.5396 |
| 17 | −17.0738 | 0.4604 | −0.0738 | −0.6145 |
| 18 | −18.1621 | 0.3855 | −0.1621 | −0.7172 |

A thickness of a lens having an actual shape is obtained by converting an optical path difference in the direction along the optical axis required at a location of each zone. This conversion is done by multiplying the calculation result of the tenth-order optical path difference function by the thickness $\Delta X$, in the direction along the optical axis, corresponding to a wavelength for each zone. Since $\Delta X$ is a thickness corresponding to one wavelength at the peripheral side end of each zone in the direction along the optical axis, and $\phi o(N)-N$ indicated in the above table represents a remainder less than a wavelength, it is possible to determine thickness of the lens, in the direction along the optical axis, corresponding to the remainder by multiplying $\Delta X$ by $\phi o(N)-N$.

It should be noted that $\Delta X$ indicated in Table 8 is a value at the peripheral side end of each zone. For determining a step value at the central side end, it is sufficient to refer to a value of $\Delta X$ of the zone located on the inner side by one step. For determining an optical path length difference for the middle portion, it is possible to design with a sufficient accuracy by utilizing a mean value between values of $\Delta X$ of the outer and inner zones with respect to the middle portion, without creating a new value $\Delta X$ especially for the middle portion of a zone which is not listed in Table 8.

Table 9 indicates $\Delta Xi(N)$, $\Delta Xc(N)$ and $\Delta Xo(N)$ which are thicknesses at the inner side end (i.e., the central side end), the middle portion, and the outer side end (i.e., the peripheral side end).

TABLE 9

| Zone No. N | ΔXi (N) | ΔXc (N) | ΔXo (N) |
|---|---|---|---|
| 0 |  | 0 | 0.000730 |
| 1 | −0.000729 | 0.000000 | 0.000736 |
| 2 | −0.000735 | 0.000001 | 0.000742 |
| 3 | −0.000741 | 0.000000 | 0.000746 |
| 4 | −0.000750 | −0.000004 | 0.000748 |
| 5 | −0.000761 | 0.000010 | 0.000746 |
| 6 | −0.000776 | −0.000021 | 0.000740 |
| 7 | −0.000794 | −0.000035 | 0.000731 |
| 8 | −0.000816 | −0.000052 | 0.000719 |
| 9 | −0.000841 | −0.000070 | 0.000707 |
| 10 | −0.000866 | −0.000088 | 0.000697 |
| 11 | −0.000889 | −0.000103 | 0.000691 |
| 12 | −0.000908 | −0.000112 | 0.000694 |
| 13 | −0.000918 | −0.000109 | 0.000710 |
| 14 | −0.000914 | −0.000091 | 0.000744 |
| 15 | −0.000892 | −0.000050 | 0.000804 |
| 16 | −0.000844 | 0.000018 | 0.000895 |
| 17 | −0.000764 | 0.000123 | 0.001026 |
| 18 | −0.000643 | 0.000271 | 0.001204 |

An actual shape is determined from lens thickness data for additional amounts of the optical path difference and the macroscopic shape indicated in Table 5. Table 10 indicates data of the actual shape. This macroscopic shape data is a sag data indicating sag amounts including data of the base curve.

TABLE 10

Actual fine shape X (mm)

| Zone No. N | Xi (N) | Xc (N) | Xo (N) |
|---|---|---|---|
| 0 |  | 0 | 0.024301 |
| 1 | 0.022836 | 0.047026 | 0.071104 |
| 2 | 0.069626 | 0.093603 | 0.117476 |
| 3 | 0.115986 | 0.139767 | 0.163454 |
| 4 | 0.161951 | 0.185553 | 0.209068 |
| 5 | 0.207553 | 0.230990 | 0.254346 |
| 6 | 0.252818 | 0.276102 | 0.299309 |
| 7 | 0.297767 | 0.320906 | 0.343971 |
| 8 | 0.342417 | 0.365416 | 0.388344 |
| 9 | 0.386777 | 0.409641 | 0.432434 |
| 10 | 0.430854 | 0.453583 | 0.476241 |
| 11 | 0.474647 | 0.497240 | 0.519760 |
| 12 | 0.518154 | 0.540606 | 0.562984 |
| 13 | 0.561365 | 0.583671 | 0.605898 |
| 14 | 0.604267 | 0.626418 | 0.648486 |

TABLE 10-continued

Actual fine shape X (mm)

| Zone No. N | Xi (N) | Xc (N) | Xo (N) |
|---|---|---|---|
| 15 | 0.646843 | 0.668830 | 0.690726 |
| 16 | 0.689073 | 0.710882 | 0.732594 |
| 17 | 0.730930 | 0.752548 | 0.774061 |
| 18 | 0.772388 | 0.793799 | 0.815097 |

Although it is possible, when a diffractive lens (or a molding die therefor) is to be manufactured with a super precise lathe, to prepare working data by determining data on each point of zones such as the data shown in Table 11 for each feeding pitch of the byte, it is desirable, for reducing a calculation amount, to approximate a feeding locus of a byte with use of a function. In this embodiment, coefficients of the 0th, 2nd and 4th orders are determined by approximating lens thicknesses corresponding to the optical path differences at the three points determined for each zone with a fourth-order polynomial function and feeding amounts of a byte are controlled on the basis of the approximation polynomial function, which is indicated below as formula 13. Coefficients $B_{0N}$, $B_{2N}$ and $B_{4N}$ of the fourth-order function (i.e., formula 13) passing through three points can be determined according to formulae 10, 11 and 12.

$$B_{0N} = \{\Delta Xi(N) \times hc(N)^2 \times ho(N)^4 + \Delta Xo(N) \times hi(N)^2 \times hc(N)^4 + \qquad (10)$$
$$\Delta Xc(N) \times ho(N)^2 \times hi(N)^4 - \Delta Xi(N) \times hc(N)^4 \times ho(N)^2 -$$
$$\Delta Xo(N) \times hi(N)^4 \times hc(N)^2 - \Delta Xc(N) \times ho(N)^4 \times hi(N)^2\}/$$
$$\{hc(N)^2 \times ho(N)^4 + hi(N)^2 \times hc(N)^4 + ho(N)^2 \times hi(N)^4 -$$
$$hc(N)^4 \times ho(N)^2 - hi(N)^4 \times hc(N)^2 - ho(N)^4 \times hi(N)^2\}$$

$$B_{2N} = \{\Delta Xc(N) \times ho(N)^4 + \Delta Xi(N) \times hc(N)^4 + \qquad (11)$$
$$\Delta Xo(N) \times hi(N)^4 - \Delta Xo(N) \times hc(N)^4 -$$
$$\Delta Xc(N) \times hi(N)^4 - \Delta Xi(N) \times ho(N)^4\}/$$
$$\{hc(N)^2 \times ho(N)^4 + hi(N)^2 \times hc(N)^4 + ho(N)^2 \times hi(N)^4 -$$
$$hc(N)^4 \times ho(N)^2 - hi(N)^4 \times hc(N)^2 - ho(N)^4 \times hi(N)^2\}$$

$$B_{4N} = \{\Delta Xo(N) \times hc(N)^2 + \Delta Xc(N) \times hi(N)^2 + \qquad (12)$$
$$\Delta Xi(N) \times ho(N)^2 - \Delta Xc(N) \times ho(N)^2 -$$
$$\Delta Xi(N) \times hc(N)^2 - \Delta Xo(N) \times hi(N)^2\}/$$
$$\{hc(N)^2 \times ho(N)^4 + hi(N)^2 \times hc(N)^4 + ho(N)^2 \times hi(N)^4 -$$
$$hc(N)^4 \times ho(N)^2 - hi(N)^4 \times hc(N)^2 - ho(N)^4 \times hi(N)^2\}$$

Table 11 indicates calculation results of the coefficients, when the sag amount of the microscopic structure to be added to the macroscopic shape is approximated using the fourth-order function.

TABLE 11

| Zone No. N | Coefficient of the 0th order B0N | Coefficient of the 2nd order B2N | Coefficient of the 4th order B4N |
|---|---|---|---|
| 0 | 0.0000000 | 0.0078084 | 0.0000000 |
| 1 | −0.0014530 | 0.0076664 | $8.1589 \times 10^{-4}$ |
| 2 | −0.0029055 | 0.0075970 | $8.1963 \times 10^{-4}$ |
| 3 | −0.0043565 | 0.0075236 | $8.2380 \times 10^{-4}$ |
| 4 | −0.0058041 | 0.0074423 | $8.3127 \times 10^{-4}$ |
| 5 | −0.0072445 | 0.0073468 | $8.4465 \times 10^{-4}$ |
| 6 | −0.0086709 | 0.0072284 | $8.6631 \times 10^{-4}$ |
| 7 | −0.0100739 | 0.0070768 | $8.9841 \times 10^{-4}$ |
| 8 | −0.0114404 | 0.0068804 | $9.4294 \times 10^{-4}$ |
| 9 | −0.0127538 | 0.0066260 | $1.0018 \times 10^{-3}$ |
| 10 | −0.0139939 | 0.0062997 | $1.0766 \times 10^{-3}$ |
| 11 | −0.0151366 | 0.0058864 | $1.1689 \times 10^{-3}$ |
| 12 | −0.0161542 | 0.0053708 | $1.2802 \times 10^{-3}$ |
| 13 | −0.0170157 | 0.0047370 | $1.4118 \times 10^{-3}$ |
| 14 | −0.0176866 | 0.0039694 | $1.5646 \times 10^{-3}$ |
| 15 | −0.0181305 | 0.0030526 | $1.7394 \times 10^{-3}$ |
| 16 | −0.0183088 | 0.0019726 | $1.9368 \times 10^{-3}$ |
| 17 | −0.0181828 | 0.0007165 | $2.1570 \times 10^{-3}$ |
| 18 | −0.0177141 | −0.0007263 | $2.3998 \times 10^{-3}$ |

Based on the coefficients indicated in Table 11, r indicated in Table 1, aspherical surface coefficients indicated in Table 2, and formula 13, the macroscopic shape (i.e., the sag amount) X for a given h (i.e., the height from the optical axis) can be obtained.

$$X(h, N) = \frac{h^2}{r \times \left(1 + \sqrt{\frac{1 - (1 + K) \times h^2}{r^2}}\right)} + A_4 h^4 + \qquad (13)$$
$$A_6 h^6 + A_8 h^8 + A_{10} h^{10} + B_{0N} + B_{2N} h^2 + B_{4N} h^4$$

Where, x is a sag amount in relation to a tangential plane, h is a distance from an optical axis of said diffractive lens, N represents a zone number counted from a zone on a central side, r represents a macroscopic radius, K represents a conical coefficient, A4, A6, A8 and A10 respectively represent 4th-order, 6th-order, 8th-order and 10th-order aspherical surface coefficients, and B0N, B2N and B4N respectively represent 0th-order, second-order and fourth-order microscopic coefficients of an N-th zone.

Alternatively, it is possible to express the entire microscopic shape as a forth-order function or a second-order function for each zone. If the fourth-order function is used, a zone shape is expressed by formula 14 below, and the coefficients C0N, C2N and C4N are obtained based on formulae 15, 16 and 17. The calculation results are shown in Table 12.

$$X(h, N) = C_{0N} + C_{2N} h^2 + C_{4N} h^4 \qquad (14)$$

$$C_{0N} = \{Xi(N) \times hc(N)^2 \times ho(N)^4 + Xo(N) \times hi(N)^2 \times hc(N)^4 + \qquad (15)$$
$$Xc(N) \times ho(N)^2 \times hi(N)^4 - Xi(N) \times hc(N)^4 \times ho(N)^2 -$$
$$Xo(N) \times hi(N)^4 \times hc(N)^2 - Xc(N) \times ho(N)^4 \times hi(N)^2\}/$$
$$\{hc(N)^2 \times ho(N)^4 + hi(N)^2 \times hc(N)^4 + ho(N)^2 \times hi(N)^4 -$$
$$hc(N)^4 \times ho(N)^2 - hi(N)^4 \times hc(N)^2 - ho(N)^4 \times hi(N)^2\}$$

$$C_{2N} = \{Xc(N) \times ho(N)^4 + Xi(N) \times hc(N)^4 + \qquad (16)$$
$$Xo(N) \times hi(N)^4 - Xo(N) \times hc(N)^4 -$$
$$Xc(N) \times hi(N)^4 - Xi(N) \times ho(N)^4\}/$$
$$\{hc(N)^2 \times ho(N)^4 + hi(N)^2 \times hc(N)^4 + ho(N)^2 \times hi(N)^4 -$$
$$hc(N)^4 \times ho(N)^2 - hi(N)^4 \times hc(N)^2 - ho(N)^4 \times hi(N)^2\}$$

-continued $$C_{4N} = \{Xo(N) \times hc(N)^2 + Xc(N) \times hi(N)^2 + \qquad (17)$$
$$Xi(N) \times ho(N)^2 - Xc(N) \times ho(N)^2 -$$
$$Xi(N) \times hc(N)^2 - Xo(N) \times hi(N)^2\}/$$
$$\{hc(N)^2 \times ho(N)^4 + hi(N)^2 \times hc(N)^4 + ho(N)^2 \times hi(N)^4 -$$
$$hc(N)^4 \times ho(N)^2 - hi(N)^4 \times hc(N)^2 - ho(N)^4 \times hi(N)^2\}$$

TABLE 12

| Zone No. N | 0th-order Coefficient C0N | 2nd-order Coefficient C2N | 4th-order Coefficient C4N |
|---|---|---|---|
| 0 | 0.0000000 | 0.2600433 | 0.0000 |
| 1 | −0.0014699 | 0.2593101 | $8.3768 \times 10^{-3}$ |
| 2 | −0.0029527 | 0.2592799 | $8.5535 \times 10^{-3}$ |
| 3 | −0.0044402 | 0.2591988 | $8.7190 \times 10^{-3}$ |
| 4 | −0.0059338 | 0.2590979 | $8.8560 \times 10^{-3}$ |
| 5 | −0.0074489 | 0.2590228 | $8.9489 \times 10^{-3}$ |
| 6 | −0.0090184 | 0.2590305 | $8.9843 \times 10^{-3}$ |
| 7 | −0.0106940 | 0.2591865 | $8.9506 \times 10^{-3}$ |
| 8 | −0.0125474 | 0.2595632 | $8.8375 \times 10^{-3}$ |
| 9 | −0.0146709 | 0.2602377 | $8.6361 \times 10^{-3}$ |
| 10 | −0.0171770 | 0.2612905 | $8.3386 \times 10^{-3}$ |
| 11 | −0.0201975 | 0.2628044 | $7.9383 \times 10^{-3}$ |
| 12 | −0.0238835 | 0.2648633 | $7.4296 \times 10^{-3}$ |
| 13 | −0.0284035 | 0.2675516 | $6.8074 \times 10^{-3}$ |
| 14 | −0.0339428 | 0.2709531 | $6.0678 \times 10^{-3}$ |
| 15 | −0.0407016 | 0.2751505 | $5.2073 \times 10^{-3}$ |
| 16 | −0.0488942 | 0.2802252 | $4.2230 \times 10^{-3}$ |
| 17 | −0.0587470 | 0.2862561 | $3.1128 \times 10^{-3}$ |
| 18 | −0.0704971 | 0.2933200 | $1.8751 \times 10^{-3}$ |

Based on the coefficients indicated in Table 12, and formula 14, the macroscopic shape (i.e., the sag amount) X for a given h (i.e., the height from the optical axis) can be obtained.

The microscopic structure can be expressed using a second-order function for each zone. In this case, formula 18 is used as the function, and coefficients C0N and C2N are obtained from formulae 19 and 20 below.

$$X(h,N) = C_{0N} + C_{2N} h^2 \qquad (18)$$

$$C_{0N} = \{Xi(N) \times ho(N)^2 - Xo(N) \times hi(N)^2\}/\{ho(N)^2 - hi(N)^2\} \qquad (19)$$

$$C_{0N} = \{Xo(N) - Xi(N)\}/\{ho(N)^2 - hi(N)^2\} \qquad (20)$$

Now, description will be made of a second embodiment which is an example where the lens designing method is applied to a general lens 10M having an angle of view (wherein rays are incident obliquely with respect to an optical axis).

The lens 10M according to the second embodiment is a lens used for forming an optical image of visible rays on a light receiving device such as a CCD having a minute light receiving area. This lens 10M is formed as a diffractive-refractive hybrid lens composed of a lens which is made of a glass material and has two aspherical surfaces, and a diffractive lens is formed onto a surface on which a light flux is incident. A plate-like medium having parallel surface is present on a side of an imaging surface of a condenser lens.

Figure 3:
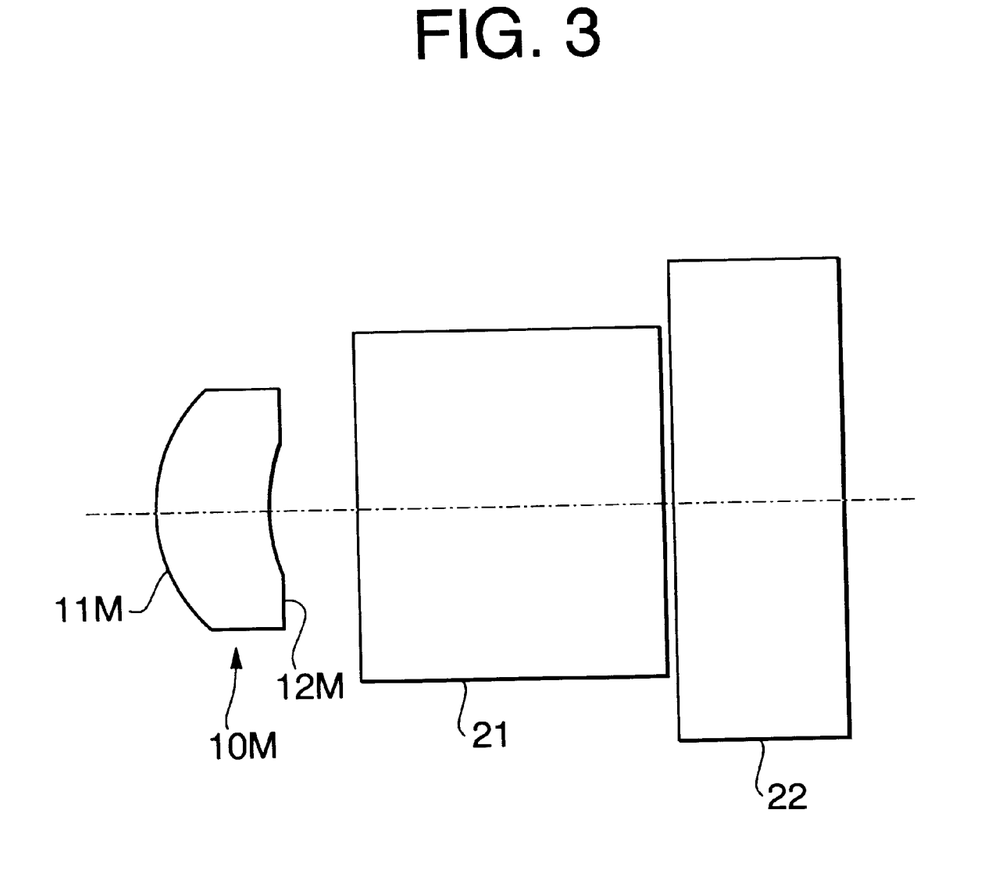
FIG. 3 is a sectional view illustrating a condenser lens preferred as a second embodiment of the present invention.

Numerical data representing a macroscopic shape of the lens according to the second embodiment is indicated in Table 13. This lens 10M is designed using the optical path difference function and has no ultra-high index data. A first surface 11M is a diffractive-refractive hybrid surface, a refractive lens made of a plastic material is present between the first surface 11M and a second surface 12M, and a third surface through a sixth surface represent two plates 21 and 22 respectively having parallel plane surfaces (see FIG. 3).

In Table 13, a reference symbol f represents a focal length (unit: mm) of the hybrid lens as a whole at the wavelength of the d-line (587.56 nm), a reference symbol W represents half an angle of view, a reference symbol r represents a radius of curvature (unit: mm) at an intersection with an optical axis, a reference symbol d represents a distance (unit: mm) between surfaces, a reference symbol nd represents a refractive index for the wavelength of the d-line (587.56 nm), and a reference symbol vd denotes an Abbe's number. Conical coefficients K and aspherical surface coefficients of the fourth, sixth, eighth and tenth orders which define shapes of the first and second aspherical surfaces are indicated in Table 14.

TABLE 13 f10.00　　Fno = 2.80　　W = 23.6°

| Surface No. | r | d | nd | vd |
|---|---|---|---|---|
| 1 | 3.297 | 2.000 | 1.80518 | 25.4 |
| 2 | 3.615 | | | |
| 3 | ∞ | 5.500 | 1.69680 | 55.5 |
| 4 | ∞ | | | |
| 5 | ∞ | 3.000 | 1.51633 | 64.1 |
| 6 | ∞ | | | |

Optical path difference function coefficients for the first surface

P2=−1.2450×10⁻¹

$P2 = -1.2450 \times 10^{-1}$ $P4 = -2.9100 \times 10^{-1}$ $P6 = -9.1300 \times 10^{-3}$ $P8 = -1.7600 \times 10^{-3}$

TABLE 14

| | | | | | |
|---|---|---|---|---|---|
| First surface | K = 0.00 | A4 = $1.350 \times 10^{-3}$ | A6 = $2.600 \times 10^{-4}$ | A8 = $-3.0500 \times 10^{-5}$ | A10 = $1.3800 \times 10^{-5}$ |
| Second surface | K = 0.00 | A4 = $8.900 \times 10^{-3}$ | A6 = $2.920 \times 10^{-3}$ | A8 = $-1.0300 \times 10^{-3}$ | A10 = $6.7800 \times 10^{-4}$ |

Focal length of diffractive lens: f doe=$-1/(2\lambda P2)$=70.457
Blazed wavelength: 570 nm First, a boundary point of a zone is determined based on an optical path difference function φ8 which uses the coefficients up to the eighth order. The optical path difference function φ8 is defined as formula 21.

$$\phi_8 = P_2 \times h^2 + P_4 \times h^4 + P_6 \times h^6 + P_8 \times h^8 \qquad (21)$$

Unlike the case in which the fourth-order function is used, the optical path difference function φ8 requires repeated calculations, but enables calculation with sufficient accuracy.

Table 15 shown below indicates a height hi(N) of a peripheral side end from the optical axis, a height hc(N) of a middle point from the optical axis, and a height ho(N) of a central side end from the optical axis of an N-th zone counted from the center, for each zone. These values can be determined through repeated calculations by Newton's method or the like. It should be noted that- the first surface has an effective radius of 2.2 mm, and since a total number of zones is 70, data of middle zones are omitted in Table 15.

TABLE 15

Height h (mm) of N-th zone as measured from optical axis

| Zone No. N | hi (N) | hc (N) | ho (N) |
|---|---|---|---|
| 0 | 0.0000 | 0.0000 | 0.2003 |
| 1 | 0.2003 | 0.2831 | 0.3466 |
| 2 | 0.3466 | 0.4001 | 0.4471 |
| 3 | 0.4471 | 0.4895 | 0.5285 |
| 4 | 0.5285 | 0.5674 | 0.5987 |
| 5 | 0.5987 | 0.6308 | 0.6612 |
| 6 | 0.6612 | 0.6903 | 0.7182 |
| 7 | 0.7182 | 0.7449 | 0.7707 |
| 8 | 0.7707 | 0.7956 | 0.8197 |
| 9 | 0.8197 | 0.8431 | 0.8658 |
| 10 | 0.8658 | 0.8878 | 0.9093 |
| 11 | 0.9093 | 0.9303 | 0.9508 |
| 12 | 0.9508 | 0.9708 | 0.9903 |
| 13 | 0.9903 | 1.0094 | 1.0282 |
| 14 | 1.0282 | 1.0466 | 1.0646 |
| 15 | 1.0646 | 1.0823 | 1.0996 |
| 16 | 1.0996 | 1.1167 | 1.1335 |
| 17 | 1.1335 | 1.1500 | 1.1662 |
| 18 | 1.1662 | 1.1822 | 1.1979 |
| 19 | 1.1979 | 1.2134 | 1.2287 |
| 20 | 1.2287 | 1.2438 | 1.2586 |
| 21 | 1.2586 | 1.2733 | 1.2877 |
| 22 | 1.2877 | 1.3020 | 1.3161 |
| 23 | 1.3161 | 1.3300 | 1.3437 |
| 24 | 1.3437 | 1.3573 | 1.3707 |
| 25 | 1.3707 | 1.3839 | 1.3970 |
| 26 | 1.3970 | 1.4100 | 1.4228 |
| 27 | 1.4228 | 1.4354 | 1.4480 |
| 28 | 1.4480 | 1.4604 | 1.4726 |
| 29 | 1.4726 | 1.4848 | 1.4968 |
| 30 | 1.4968 | 1.5087 | 1.5205 |
| 35 | 1.6108 | 1.6216 | 1.6323 |
| 40 | 1.7150 | 1.7250 | 1.7348 |
| 45 | 1.8112 | 1.8204 | 1.8296 |
| 50 | 1.9006 | 1.9092 | 1.9177 |
| 55 | 1.9841 | 1.9921 | 2.0001 |
| 60 | 2.0624 | 2.0700 | 2.0775 |
| 65 | 2.1361 | 2.1433 | 2.1504 |
| 70 | 2.2058 | 2.2125 | 2.2192 |

Then, a macroscopic shape of the diffractive-refractive hybrid surface, i.e., the central side end point, the middle portion, and the peripheral side end of each zone, which are defined by the aspherical surface coefficients, are obtained. The macroscopic shape is calculated by formula 6.

Calculation results are indicated in Table 16. Note the macroscopic shape is defined as a continuous, and rotationally symmetrical surface having no steps.

TABLE 16

X (mm) of macroscopic shape

| Zone No. N | Xi (N) | Xc (N) | Xo (N) |
|---|---|---|---|
| 0 |  | 0.000000 | 0.006093 |
| 1 | 0.006093 | 0.012189 | 0.018291 |
| 2 | 0.018291 | 0.024396 | 0.030506 |
| 3 | 0.030506 | 0.036621 | 0.042741 |
| 4 | 0.042741 | 0.048865 | 0.054994 |
| 5 | 0.054994 | 0.061128 | 0.067267 |
| 6 | 0.067267 | 0.073411 | 0.079560 |
| 7 | 0.079560 | 0.085715 | 0.091874 |
| 8 | 0.091874 | 0.098039 | 0.104209 |

TABLE 16-continued

X (mm) of macroscopic shape

| Zone No. N | Xi (N) | Xc (N) | Xo (N) |
|---|---|---|---|
| 9 | 0.104209 | 0.110385 | 0.116566 |
| 10 | 0.116566 | 0.122753 | 0.128945 |
| 11 | 0.128945 | 0.135143 | 0.141346 |
| 12 | 0.141346 | 0.147556 | 0.153771 |
| 13 | 0.153771 | 0.159992 | 0.166219 |
| 14 | 0.166219 | 0.172452 | 0.178692 |
| 15 | 0.178692 | 0.184937 | 0.191189 |
| 16 | 0.191189 | 0.197446 | 0.203710 |
| 17 | 0.203710 | 0.209981 | 0.216258 |
| 18 | 0.216258 | 0.222541 | 0.228832 |
| 19 | 0.228832 | 0.235128 | 0.241432 |
| 20 | 0.241432 | 0.247742 | 0.254059 |
| 21 | 0.254059 | 0.260384 | 0.266715 |
| 22 | 0.266715 | 0.273053 | 0.279399 |
| 23 | 0.279399 | 0.285752 | 0.292112 |
| 24 | 0.292112 | 0.298480 | 0.304855 |
| 25 | 0.304855 | 0.311239 | 0.317629 |
| 26 | 0.317629 | 0.324028 | 0.330435 |
| 27 | 0.330435 | 0.336850 | 0.343273 |
| 28 | 0.343273 | 0.349704 | 0.356144 |
| 29 | 0.356144 | 0.362592 | 0.369049 |
| 30 | 0.369049 | 0.375514 | 0.381989 |
| 35 | 0.434121 | 0.440682 | 0.447252 |
| 40 | 0.500209 | 0.506879 | 0.513562 |
| 45 | 0.567475 | 0.574273 | 0.581086 |
| 50 | 0.636110 | 0.643057 | 0.650020 |
| 55 | 0.706331 | 0.713449 | 0.720585 |
| 60 | 0.778372 | 0.785686 | 0.793021 |
| 65 | 0.852491 | 0.860027 | 0.867587 |
| 70 | 0.928955 | 0.936742 | 0.944554 |

Next, an angle of incidence of a ray on each zone which is obtained from the macroscopic shape described above.

A first differential $dXo(N)/dh$ is calculated by differentiating the macroscopic shape with respect to a height h, a component L, in the direction along the optical axis, of a direction cosine is determined based on the first differential according to formula 7. Further, an angle $\alpha$ (rad.) of a surface defined by the macroscopic shape relative to the optical axis is determined using formula 8. In this example, since an angle W formed between an incident ray and the optical axis varies depending on the angles of view, an average angle of incidence is obtained.

If the lens has a relatively large angle of view and a light flux has a considerable width, and accordingly it is impossible to determine an angle of incidence represented by a single ray, a microscopic structure is determined by utilizing an average angle of incidence of rays incident on the surface.

For enhancing a diffraction efficiency, the following methods can be used:

(1) a method to adopt an average value between a minimum value and a maximum value of absolute values of angles of incidence;

(2) a method to adopt an average value of absolute values of incident angles with taking an image area into consideration; and/or (3) a method to adopt a square root of an average of squares of $\theta$ taking an image area into consideration.

In view of the fact that thickness of a step to be finally determined varies with the square of an angle of incidence, the embodiment adopts the method to determine the angle of incidence based on an average of squares of angles of incidence.

Description will be made of the method to determine an angle of incidence using the average root-mean-square method.

A distribution of rays which are incident on a point on a lens (contribute effectively for imaging) cannot be simply determined. Since it is troublesome to determine an angle of incidence on each point, a step at each point is determined, in the second embodiment, by a simple calculation under relatively rough conditions indicated below.

The conditions are:

(1) Rays incident on a point is within a completely conical region; and (2) Angles of incidence are distributed at equal intervals on concentric circles.

An average angle of incidence will be determined as the square root of an average of squares of θ as described above on assumption that the above conditions are satisfied.

It is not impossible to determine the average angle of incidence without substantially no approximation with recent design tools. In cases of photographic lenses whose image surfaces to be effectively utilized have rectangular shapes, however, distributions of angles of incidence are different depending on directions of image heights, whereby rotational symmetry of surfaces is lost and amounts of calculations are increased explosively. In cases of lenses which have certain amounts of angles of view and light flux widths, it is unnecessary to calculate so accurately since most of such lenses have wavelength-dependent characteristics, contributions to enhancement of diffraction efficiencies corresponding to variations of angles of incidence obtained by enhancing calculation accuracy may be cancelled caused by the terms related to the wavelength-dependent characteristics. When a simple average angle of incidence is represented by m, half a value of an angle width is represented by r, and an average angle of incidence is represented by U, on the assumptions made above, formula 22 is applicable.

$$U = \sqrt{r^2/2 + m^2} \qquad (22)$$

For formula 22, r and m can be determined as follows:

(1) In a meridional section, a maximum angle θU and a minimum angle θL of ray which can be incident at a height h on a surface are determined by ray tracing;

(2) the angles θU and θL are defined as functions of h so that θU and θL can be determined for any h; and (3) m=((θU+θL)/2- an angle α of a normal to the surface)

$r=(θU-θL)/2$

As a result of these calculations, the average RMS angle of incidence θ (rad.) at each point is as indicated in Table 17. Since the actual shape of the surface of the diffractive optical lens is not determined, the angle θ is calculated using a macroscopic shape.

TABLE 17

| Zone No. N | First differential dxo/dh | Direction cosine L | Angle of surface α (rad.) | average RMS incident angle θ |
|---|---|---|---|---|
| 0 | 0.0609 | 0.9982 | 0.0608 | 0.2971 |
| 1 | 0.1059 | 0.9944 | 0.1056 | 0.2977 |
| 2 | 0.1374 | 0.9907 | 0.1365 | 0.3035 |
| 3 | 0.1632 | 0.9869 | 0.1618 | 0.3099 |
| 4 | 0.1859 | 0.9832 | 0.1838 | 0.3165 |
| 5 | 0.2065 | 0.9793 | 0.2036 | 0.3229 |
| 6 | 0.2255 | 0.9755 | 0.2218 | 0.3293 |

TABLE 17-continued

| Zone No. N | First differential dxo/dh | Direction cosine L | Angle of surface α (rad.) | average RMS incident angle θ |
|---|---|---|---|---|
| 7 | 0.2433 | 0.9717 | 0.2387 | 0.3354 |
| 8 | 0.2602 | 0.9678 | 0.2546 | 0.3414 |
| 9 | 0.2764 | 0.9639 | 0.2696 | 0.3472 |
| 10 | 0.2919 | 0.9599 | 0.2840 | 0.3528 |
| 11 | 0.3069 | 0.9560 | 0.2978 | 0.3582 |
| 12 | 0.3215 | 0.9520 | 0.3111 | 0.3633 |
| 13 | 0.3358 | 0.9480 | 0.3239 | 0.3683 |
| 14 | 0.3497 | 0.9440 | 0.3364 | 0.3730 |
| 15 | 0.3633 | 0.9399 | 0.3485 | 0.3775 |
| 16 | 0.3767 | 0.9358 | 0.3603 | 0.3818 |
| 17 | 0.3899 | 0.9317 | 0.3718 | 0.3859 |
| 18 | 0.4030 | 0.9275 | 0.3831 | 0.3899 |
| 19 | 0.4158 | 0.9233 | 0.3941 | 0.3936 |
| 20 | 0.4286 | 0.9191 | 0.4049 | 0.3971 |
| 21 | 0.4412 | 0.9149 | 0.4155 | 0.4005 |
| 22 | 0.4538 | 0.9106 | 0.4260 | 0.4037 |
| 23 | 0.4663 | 0.9063 | 0.4363 | 0.4067 |
| 24 | 0.4787 | 0.9020 | 0.4465 | 0.4096 |
| 25 | 0.4911 | 0.8976 | 0.4565 | 0.4123 |
| 26 | 0.5034 | 0.8932 | 0.4664 | 0.4149 |
| 27 | 0.5158 | 0.8888 | 0.4762 | 0.4173 |
| 28 | 0.5281 | 0.8843 | 0.4859 | 0.4196 |
| 29 | 0.5404 | 0.8797 | 0.4955 | 0.4217 |
| 30 | 0.5528 | 0.8752 | 0.5050 | 0.4237 |
| 35 | 0.6152 | 0.8517 | 0.5515 | 0.4321 |
| 40 | 0.6796 | 0.8271 | 0.5969 | 0.4381 |
| 45 | 0.7471 | 0.8011 | 0.6416 | 0.4424 |
| 50 | 0.8188 | 0.7737 | 0.6861 | 0.4455 |
| 55 | 0.8957 | 0.7449 | 0.7304 | 0.4480 |
| 60 | 0.9790 | 0.7146 | 0.7748 | 0.4502 |
| 65 | 1.0696 | 0.6829 | 0.8190 | 0.4523 |
| 70 | 1.1686 | 0.6502 | 0.8630 | 0.4544 |

On the basis of the angle of incidence θ described above, its cosine is determined, cosine of an angle of refraction is calculated using a refractive index of an actual material and thickness Δt along the normal is calculated using the cosine values according to formula 9. When an angle formed between the optical axis and the normal to the surface is represented by a for converting this step into a step ΔX, ΔX is expressed as Δt/cos α. Calculation results are indicated in Table 18.

TABLE 18

| Zone No. N | cos θ | cos θ' | Δt | ΔX |
|---|---|---|---|---|
| 0 | 0.9562 | 0.9868 | −0.0006908 | −0.0006921 |
| 1 | 0.9560 | 0.9867 | −0.0006908 | −0.0006946 |
| 2 | 0.9543 | 0.9862 | −0.0006901 | −0.0006966 |
| 3 | 0.9523 | 0.9856 | −0.0006893 | −0.0006985 |
| 4 | 0.9503 | 0.9850 | −0.0006886 | −0.0007004 |
| 5 | 0.9483 | 0.9844 | −0.0006878 | −0.0007023 |
| 6 | 0.9463 | 0.9838 | −0.0006870 | −0.0007042 |
| 7 | 0.9443 | 0.9832 | −0.0006862 | −0.0007062 |
| 8 | 0.9423 | 0.9826 | −0.0006854 | −0.0007083 |
| 9 | 0.9403 | 0.9821 | −0.0006847 | −0.0007104 |
| 10 | 0.9384 | 0.9815 | −0.0006840 | −0.0007125 |
| 11 | 0.9365 | 0.9810 | −0.0006832 | −0.0007147 |
| 12 | 0.9347 | 0.9804 | −0.0006825 | −0.0007169 |
| 13 | 0.9330 | 0.9799 | −0.0006818 | −0.0007193 |
| 14 | 0.9312 | 0.9794 | −0.0006812 | −0.0007216 |
| 15 | 0.9296 | 0.9789 | −0.0006805 | −0.0007241 |
| 16 | 0.9280 | 0.9785 | −0.0006799 | −0.0007266 |
| 17 | 0.9264 | 0.9780 | −0.0006793 | −0.0007292 |
| 18 | 0.9250 | 0.9776 | −0.0006788 | −0.0007318 |
| 19 | 0.9235 | 0.9772 | −0.0006782 | −0.0007345 |
| 20 | 0.9222 | 0.9768 | −0.0006777 | −0.0007373 |
| 21 | 0.9209 | 0.9764 | −0.0006772 | −0.0007402 |
| 22 | 0.9196 | 0.9760 | −0.0006767 | −0.0007431 |
| 23 | 0.9184 | 0.9757 | −0.0006763 | −0.0007462 |

TABLE 18-continued

| Zone No. N | cos θ | cos θ' | Δt | ΔX |
|---|---|---|---|---|
| 24 | 0.9173 | 0.9754 | −0.0006758 | −0.0007493 |
| 25 | 0.9162 | 0.9750 | −0.0006754 | −0.0007524 |
| 26 | 0.9152 | 0.9748 | −0.0006750 | −0.0007557 |
| 27 | 0.9142 | 0.9745 | −0.0006746 | −0.0007591 |
| 28 | 0.9133 | 0.9742 | −0.0006743 | −0.0007625 |
| 29 | 0.9124 | 0.9740 | −0.0006739 | −0.0007661 |
| 30 | 0.9116 | 0.9737 | −0.0006736 | −0.0007697 |
| 35 | 0.9081 | 0.9727 | −0.0006723 | −0.0007893 |
| 40 | 0.9056 | 0.9720 | −0.0006713 | −0.0008117 |
| 45 | 0.9037 | 0.9715 | −0.0006706 | −0.0008371 |
| 50 | 0.9024 | 0.9711 | −0.0006701 | −0.0008661 |
| 55 | 0.9013 | 0.9708 | −0.0006697 | −0.0008991 |
| 60 | 0.9004 | 0.9705 | −0.0006693 | −0.0009367 |
| 65 | 0.8995 | 0.9703 | −0.0006690 | −0.0009796 |
| 70 | 0.8985 | 0.9700 | −0.0006686 | −0.0010284 |

Since determinations of boundary points and the like of the zones are made using the eight-order optical path difference function obtained at the design stage as described above in the second embodiment, phase deviations $\phi i(N)-N$, $\phi c(N)-N$ and $\phi o(N)-N$ from a macroscopic shape at the central side end, the middle portion and the peripheral side end of the zone are $0.500\lambda$, $0\lambda$ and $-0.500\lambda$, respectively. calculation results are indicated in Table 19.

TABLE 19

| Zone No. N | φc (N) | φi (N) − N | φc (N) − N | φo (N) − N |
|---|---|---|---|---|
| 0 | 0 |  | 0 | −0.5000 |
| All zones | −N | 0.5000 | 0.0000 | −0.5000 |

By multiplying the thickness ΔX of each zone, in the direction along the optical axis, corresponding to one wavelength by ±0.5, an optical path difference, in the direction along the optical axis, required at each location of each zone is converted into an actual shape (i.e., the microscopic shape). Calculation results are indicated in Table 20.

TABLE 20

| Zone No. N | ΔXi (N) | ΔXc (N) | ΔXo (N) |
|---|---|---|---|
| 0 |  | 0.000000 | 0.000346 |
| 1 | −0.000346 | 0.000000 | 0.000347 |
| 2 | −0.000347 | 0.000000 | 0.000348 |
| 3 | −0.000348 | 0.000000 | 0.000349 |
| 4 | −0.000349 | 0.000000 | 0.000350 |
| 5 | −0.000350 | 0.000000 | 0.000351 |
| 6 | −0.000351 | 0.000000 | 0.000352 |
| 7 | −0.000352 | 0.000000 | 0.000353 |
| 8 | −0.000353 | 0.000000 | 0.000354 |
| 9 | −0.000354 | 0.000000 | 0.000355 |
| 10 | −0.000355 | 0.000000 | 0.000356 |
| 11 | −0.000356 | 0.000000 | 0.000357 |
| 12 | −0.000357 | 0.000000 | 0.000358 |
| 13 | −0.000358 | 0.000000 | 0.000360 |
| 14 | −0.000360 | 0.000000 | 0.000361 |
| 15 | −0.000361 | 0.000000 | 0.000362 |
| 16 | −0.000362 | 0.000000 | 0.000363 |
| 17 | −0.000363 | 0.000000 | 0.000365 |
| 18 | −0.000365 | 0.000000 | 0.000366 |
| 19 | −0.000366 | 0.000000 | 0.000367 |
| 20 | −0.000367 | 0.000000 | 0.000369 |
| 21 | −0.000369 | 0.000000 | 0.000370 |
| 22 | −0.000370 | 0.000000 | 0.000372 |
| 23 | −0.000372 | 0.000000 | 0.000373 |
| 24 | −0.000373 | 0.000000 | 0.000375 |
| 25 | −0.000375 | 0.000000 | 0.000376 |
| 26 | −0.000376 | 0.000000 | 0.000378 |
| 27 | −0.000378 | 0.000000 | 0.000380 |

TABLE 20-continued

| Zone No. N | ΔXi (N) | ΔXc (N) | ΔXo (N) |
|---|---|---|---|
| 28 | −0.000380 | 0.000000 | 0.000381 |
| 29 | −0.000381 | 0.000000 | 0.000383 |
| 30 | −0.000383 | 0.000000 | 0.000385 |
| 35 | −0.000393 | 0.000000 | 0.000395 |
| 40 | −0.000403 | 0.000000 | 0.000406 |
| 45 | −0.000416 | 0.000000 | 0.000419 |
| 50 | −0.000430 | 0.000000 | 0.000433 |
| 55 | −0.000446 | 0.000000 | 0.000450 |
| 60 | −0.000464 | 0.000000 | 0.000468 |
| 65 | −0.000485 | 0.000000 | 0.000490 |
| 70 | −0.000509 | 0.000000 | 0.000514 |

From the optical path difference data and the macroscopic shape shown in Table 16, an actual shape which is required for giving the optical differences shown above is determined, which is indicated in Table 21. The data indicated in Table 21 is sag data which includes a macroscopic shape, i.e., information on a base curve.

TABLE 21

Actual fine shape X (mm)

| Zone No. N | Xi (N) | Xc (N) | Xo (N) |
|---|---|---|---|
| 0 |  | 0.000000 | 0.006439 |
| 1 | 0.005745 | 0.012189 | 0.018638 |
| 2 | 0.017942 | 0.024396 | 0.030855 |
| 3 | 0.030157 | 0.036621 | 0.043090 |
| 4 | 0.042391 | 0.048865 | 0.055344 |
| 5 | 0.054643 | 0.061128 | 0.067618 |
| 6 | 0.066915 | 0.073411 | 0.079912 |
| 7 | 0.079207 | 0.085715 | 0.092227 |
| 8 | 0.091520 | 0.098039 | 0.104563 |
| 9 | 0.103854 | 0.110385 | 0.116921 |
| 10 | 0.116210 | 0.122753 | 0.129301 |
| 11 | 0.128587 | 0.135143 | 0.141704 |
| 12 | 0.140988 | 0.147556 | 0.154130 |
| 13 | 0.153411 | 0.159992 | 0.166579 |
| 14 | 0.165859 | 0.172452 | 0.179052 |
| 15 | 0.178330 | 0.184937 | 0.191551 |
| 16 | 0.190825 | 0.197446 | 0.204074 |
| 17 | 0.203346 | 0.209981 | 0.216623 |
| 18 | 0.215892 | 0.222541 | 0.229197 |
| 19 | 0.228464 | 0.235128 | 0.241799 |
| 20 | 0.241063 | 0.247742 | 0.254428 |
| 21 | 0.253689 | 0.260384 | 0.267085 |
| 22 | 0.266343 | 0.273053 | 0.279771 |
| 23 | 0.279026 | 0.285752 | 0.292485 |
| 24 | 0.291738 | 0.298480 | 0.305230 |
| 25 | 0.304479 | 0.311239 | 0.318006 |
| 26 | 0.317252 | 0.324028 | 0.330813 |
| 27 | 0.330055 | 0.336850 | 0.343625 |
| 28 | 0.342891 | 0.349704 | 0.356525 |
| 29 | 0.355761 | 0.362592 | 0.369432 |
| 30 | 0.368664 | 0.375514 | 0.382374 |
| 35 | 0.433726 | 0.440682 | 0.447647 |
| 40 | 0.499803 | 0.506879 | 0.513968 |
| 45 | 0.567056 | 0.574273 | 0.581504 |
| 50 | 0.635677 | 0.643057 | 0.650453 |
| 55 | 0.705881 | 0.713449 | 0.721035 |
| 60 | 0.777904 | 0.785686 | 0.793490 |
| 65 | 0.852001 | 0.860027 | 0.868077 |
| 70 | 0.928441 | 0.936742 | 0.945069 |

It is possible, also in this embodiment, to determine coefficients of the 0th, 2nd and 4th orders by approximating lens thicknesses corresponding to the optical path differences at the three points determined from each zone using a fourth-order polynomial and use the calculated coefficients as working data. In the second embodiment, however, since a large number of zones are present and each zone is narrow in width, it is possible to use of a second-order polynomial and to approximation can be done with sufficient accuracy, i.e., a maximum error of $\frac{1}{300}\lambda$ or less. Formula 23 indicated below is used as the second-order polynomial, and the coefficients B0N and B2N are obtained from formulae 24 and 25. Table 22 indicates the calculation results of the coefficients using the second-order polynomial, i.e., formula 23.

$$X(h, N) = \frac{h^2}{r \times \left(1 + \sqrt{\frac{1 - (1+K) \times h^2}{r^2}}\right)} + \quad (23)$$

$$A_4 h^4 + A_6 h^6 + A_8 h^8 + A_{10} h^{10} + B_{0N} + B_{2N} h^2$$

Where, X is a sag amount with respect to a tangential plane, h is a distance from an optical axis of said diffractive lens, N represents a zone number counted from a zone on a central side, r represents a macroscopic radius, K represents a conical coefficient, A4, A6, A8 and A10 respectively represent 4th-order, 6th-order, 8th-order and 10th-order aspherical surface coefficients, and $B_{0N}$ and $B_{2N}$ respectively represent 0th-order and 2nd-order microscopic coefficients for an N-th zone.

$$B_{0N} = \{\Delta X_i(N) \times h_o(N)^2 - \Delta X_o(N) \times h_i(N)^2\}/\{h_o(N)^2 - h_i(N)^2\} \quad (24)$$

$$B_{2N} = \{\Delta X_o(N) - \Delta X_i(N)\}/\{h_o(N)^2 - h_i(N)^2\} \quad (25)$$

wherein the reference symbols $\Delta X_i(N)$ and $\Delta X_o(N)$ represent shift amounts of points at a center and a peripheral portion of an N-th zone as counted from the optical axis, and the reference symbol $h_i(N)$ and $h_o(N)$ represent distances from the optical axis to the points, respectively.

TABLE 22

| Zone No. N | Coefficient of the 0th order B0N | Coefficient of the 2nd order B2N |
|---|---|---|
| 0 | −0.0000000 | 0.0086011 |
| 1 | −0.0006918 | 0.0086411 |
| 2 | −0.0013918 | 0.0087015 |
| 3 | −0.0020978 | 0.0087584 |
| 4 | −0.0028102 | 0.0088153 |
| 5 | −0.0035293 | 0.0088727 |
| 6 | −0.0042551 | 0.0089309 |
| 7 | −0.0049878 | 0.0089899 |
| 8 | −0.0057277 | 0.0090499 |
| 9 | −0.0064750 | 0.0091109 |
| 10 | −0.0072299 | 0.0091729 |
| 11 | −0.0079927 | 0.0092361 |
| 12 | −0.0087637 | 0.0093006 |
| 13 | −0.0095431 | 0.0093662 |
| 14 | −0.0103312 | 0.0094332 |
| 15 | −0.0111283 | 0.0095016 |
| 16 | −0.0119347 | 0.0095713 |
| 17 | −0.0127508 | 0.0096425 |
| 18 | −0.0135768 | 0.0097152 |
| 19 | −0.0144131 | 0.0097894 |
| 20 | −0.0152600 | 0.0098652 |
| 21 | −0.0161180 | 0.0099426 |
| 22 | −0.0169873 | 0.0100217 |
| 23 | −0.0178681 | 0.0101025 |
| 24 | −0.0187617 | 0.0101851 |
| 25 | −0.0196675 | 0.0102696 |
| 26 | −0.0205863 | 0.0103559 |
| 27 | −0.0215185 | 0.0104441 |
| 28 | −0.0224646 | 0.0105343 |
| 29 | −0.0234251 | 0.0106265 |
| 30 | −0.0244003 | 0.0107208 |
| 35 | −0.0295167 | 0.0112256 |
| 40 | −0.0350855 | 0.0117920 |

TABLE 22-continued

| Zone No. N | Coefficient of the 0th order B0N | Coefficient of the 2nd order B2N |
|---|---|---|
| 45 | −0.0411884 | 0.0124291 |
| 50 | −0.0479229 | 0.0131479 |
| 55 | −0.0554049 | 0.0139613 |
| 60 | −0.0637718 | 0.0148838 |
| 65 | −0.0731841 | 0.0159322 |
| 70 | −0.0838284 | 0.0171253 |

Based on r indicated in Table 13, ashperical surface coefficients indicated in Table 14, B0N and B2N indicated in Table 22 and formula 26, data of sag amount X for given heights h can be obtained.

$$X(h, N) = \frac{h^2}{r \times \left(1 + \sqrt{\frac{1 - (1+K) \times h^2}{r^2}}\right)} + \quad (26)$$

$$A_4 h^4 + A_6 h^6 + A_8 h^8 + A_{10} h^{10} + B_{0N} + B_{2N} h^2$$

Where, X is a sag amount, h is a distance from an optical axis of said diffractive lens, N represents a zone number counted from a zone on a central side, r represents a macroscopic radius, K represents a conical coefficient, A4, A6, A8 and A10 respectively represent 4th-order, 6th-order, 8th-order and 10th-order aspherical surface coefficients, and B0N and B2N respectively represent 0th-order and second-order microscopic coefficients of an N-th zone.

Alternatively, as in the first embodiment, the microscopic shape can be expressed using the second-order function for each zone. In this case, the coefficients C0N and C2N for the second-order function (i.e., formula 18) are calculated based on formulae 19 and 20, and calculation results are indicated in Table 23. The zones are expressed by formulae 3, 4 and 5.

TABLE 23

| Zone No. N | 0th order coefficient C0N | 2nd order coefficient C2N |
|---|---|---|
| 0 | 0.0000000 | 0.1604489 |
| 1 | −0.0007173 | 0.1610938 |
| 2 | −0.0015136 | 0.1619474 |
| 3 | −0.0023823 | 0.1628134 |
| 4 | −0.0033252 | 0.1636922 |
| 5 | −0.0043441 | 0.1645838 |
| 6 | −0.0054409 | 0.1654883 |
| 7 | −0.0066174 | 0.1664057 |
| 8 | −0.0078754 | 0.1673362 |
| 9 | −0.0092168 | 0.1682799 |
| 10 | −0.0106437 | 0.1692370 |
| 11 | −0.0121581 | 0.1702077 |
| 12 | −0.0137620 | 0.1711924 |
| 13 | −0.0154579 | 0.1721913 |
| 14 | −0.0172479 | 0.1732050 |
| 15 | −0.0191348 | 0.1742338 |
| 16 | −0.0211210 | 0.1752782 |
| 17 | −0.0232095 | 0.1763387 |
| 18 | −0.0254031 | 0.1774160 |
| 19 | −0.0277050 | 0.1785106 |
| 20 | −0.0301186 | 0.1796232 |
| 21 | −0.0326474 | 0.1807544 |
| 22 | −0.0352949 | 0.1819050 |
| 23 | −0.0380653 | 0.1830757 |
| 24 | −0.0409624 | 0.1842673 |
| 25 | −0.0439908 | 0.1854807 |
| 26 | −0.0471549 | 0.1867166 |

TABLE 23-continued

| Zone No. N | 0th order coefficient C0N | 2nd order coefficient C2N |
|---|---|---|
| 27 | −0.0504595 | 0.1879759 |
| 28 | −0.0539096 | 0.1892596 |
| 29 | −0.0575103 | 0.1905685 |
| 30 | −0.0612671 | 0.1919035 |
| 35 | −0.0825989 | 0.1990057 |
| 40 | −0.1087797 | 0.2069133 |
| 45 | −0.1407448 | 0.2157606 |
| 50 | −0.1795647 | 0.2256868 |
| 55 | −0.2264351 | 0.2368327 |
| 60 | −0.2826639 | 0.2493389 |
| 65 | −0.3496572 | 0.2633437 |
| 70 | −0.4289044 | 0.2789816 |

Based on the coefficients B0N and B2N indicated in Table 23 and formula 18, data of sag amount X for given heights h can be obtained.

As understood from the foregoing description, the present invention enables to easily design boundaries, steps, and the like of zones of diffractive lenses using outputs from automatic design programs employing the Sweatt model or the like, and enhance calculation accuracy for obtaining high performance of the diffractive lenses.

The present disclosure relates to subject matter contained in Japanese Patent Application No. HEI 08-300948, filed on Oct. 24, 1996, which is expressly incorporated herein by reference in its entirety.

What is claimed is:

1. A method for designing a microscopic shape of a diffractive lens to be formed on a surface of a refractive lens, comprising:

expressing a function of the diffractive lens at a point on the surface of the refractive lens as an additional amount of an optical path length of rays passing through the diffractive lens;

determining an inclination of a surface based on a macroscopic shape of the diffractive lens;

obtaining a cosine of an average angle of incidence of a ray to be incident at the point on a surface of a lens to be realized;

obtaining a shift amount, in a direction along an optical axis, corresponding to a unit wavelength based on the cosine of the average angle of incidence;

determining an actual optical path difference to be given by the shift amount, in the direction along the optical axis, on the basis of the additional amount of the optical path length;

determining a shift amount in the direction along the optical axis at the point on the surface of the lens, based on the obtained shift amount in the direction along the optical axis corresponding to the unit wavelength and the optical path difference; and designing a lens based on the determined shift amount.

2. The method for designing a diffractive lens according to claim 1, wherein said function of said diffractive lens can be determined in accordance with an ultra-high index method using a Sweatt model.

3. A method for designing a diffractive lens to be formed on a surface of a refractive lens, comprising;

expressing a function of the diffractive lens as a polynomial optical path difference function using a height from an optical axis as a variable;

determining boundary points of zones to be formed as step positions, based on the polynomial optical path difference function;

obtaining an angle of incidence on each zone, based on a macroscopic shape of the diffractive lens;

determining a shift amount, in a direction along an optical axis, corresponding to a unit wavelength of an optical path difference for each zone, based on the obtained angle of incidence for each zone;

obtaining an optical path difference to be given by each zone on the basis of the polynomial optical path difference function;

determining a microscopic shape of each zone on the basis of the determined shift amount in the direction along the optical axis and the obtained optical path difference; and designing a lens from the determined microscopic shape of each zone.

4. The method for designing a diffractive lens according to claim 3, wherein the step of obtaining the angle of incidence comprises a step of determining an average angle of incidence from a design data of the diffractive lens.

5. The method for designing a diffractive lens according to claim 4, wherein the step of obtaining the average angle of incidence comprises a step of determine an angle of incidence as a root-mean-square of angles of incidence.

6. The method for designing a diffractive lens according to claim 3, wherein the step of determining the microscopic shape comprises a step of approximating the microscopic shape with a second-order polynomial.

7. The method for designing a diffractive lens according to claim 6, wherein said second-order polynomial formula for approximating said microscopic shape including a surface shape of said refractive lens is expressed by a following formula:

$$X(h, N) = \frac{h^2}{r \times \left(1 + \sqrt{1 - \frac{(1+K) \times h^2}{r^2}}\right)} + A_4 h^4 + A_6 h^6 + A_8 h^8 + A_{10} h^{10} + B_{0N} + B_{2N} h^2,$$

Where, X is a sag amount with respect to a tangential plane, h is a distance from an optical axis of said diffractive lens, N represents a zone number counted from a zone on a central side, r represents a macroscopic radius, K represents a conical coefficient, A4, A6, A8 and A10 respectively represent 4th-order, 6th-order, 8th-order and 10th-order aspherical surface coefficients, and B0N and B2N respectively represent 0th-order and second-order microscopic coefficients for an N-th zone.

8. The method for designing a diffractive lens according to claim 7, wherein each coefficient defining a diffractive lens approximated by said polynomial formula of the second order is determined by following formulae:

$$B_{0N} = \{\Delta Xi(N) \times ho(N)^2 - \Delta Xo(N) \times hi(N)^2\} / \{ho(N)^2 - hi(N)^2\};$$

and $$B_{2N} = \{\Delta Xo(N) - \Delta Xi(N)\} / \{ho(N)^2 - hi(N)^2\},$$

wherein the reference symbols ΔXi (N) and ΔXo (N) represent shift amounts of points at a cenateral end and a peripheral end of an N-th zone as counted from the optical axis, and the reference symbol hi(N) and ho(N) designate distances from the optical axis to the respective points.

9. The method for designing a diffractive lens according to claim 6, wherein the second-order polynomial formula for approximating said microscopic shape including a surface shape of said refractive lens is expressed by a following formula:

$$X(h,N) = C_{0N} + C_{2N} h^2,$$

Where, X is a sag amount, h is a distance from an optical axis of said diffractive lens, N represents a zone number counted from a zone on a central side, and C0N and C2N respectively represent 0th-order, and second-order coefficients for an N-th zone.

10. The method for designing a diffractive lens according to claim 9 wherein each coefficient defining a diffractive lens approximated by said polynomial formula of the second order is determined by following formulae:

$$C_{0N} = \{Xi(N) \times ho(N)^2 - Xo(N) \times hi(N)^2\} / \{ho(N)^2 - hi(N)^2\};$$

and $$C_{2N} = \{Xo(N) - Xi(N)\} / \{ho(N)^2 - hi(N)^2\},$$

wherein the reference symbols Xi(N) and Xo(N) represent locations, in a direction along the optical axis, of a point at a central end and a point at a peripheral end of an N-th zone as counted from the optical axis, and the reference symbols hi(N) and ho(N) designate distances from the optical axis to respective points.

11. The method for designing a diffractive lens according to claim 6, wherein the polynomial formula for approximating said microscopic shape defines a locus passing through at least two points different in height from an optical axis by utilizing symmetry of the microscopic shape of each zone with regard to the optical axis.

12. The method for designing a diffractive lens according to claim 3, wherein the step of determining the microscopic shape comprises a step of approximating the microscopic shape with a fourth-order polynomial.

13. The method for designing a diffractive lens according to claim 12, wherein the fourth-order polynomial formula for approximating said microscopic shape including a surface shape of said refractive lens is expressed by following formula:

$$X(h,N) = \frac{h^2}{r \times \left(1 + \sqrt{\frac{1 - (1+K) \times h^2}{r^2}}\right)} + A_4 h^4 + A_6 h^6 + A_8 h^8 + A_{10} h^{10} + B_{0N} + B_{2N} h^2 + B_{4N} h^4,$$

Where, X is a sag amount with respect to a tangential plane, h is a distance from an optical axis of said diffractive lens, N represents a zone number counted from a zone on a central side, r represents a macroscopic radius, K represents a conical coefficient, A4, A6, A8 and A10 respectively represent 4th-order, 6th-order, 8th-order and 10th-order aspherical surface coefficients, and B0N, B2N and B4N respectively represent 0th-order, 2nd-order and 4th-order microscopic coefficients for an N-th zone.

14. The method for designing a diffractive lens according to claim 13, wherein each coefficient defining a diffractive lens approximated by said polynomial formula of the fourth order is determined by following formulae:

$$B_{0N} = \{\Delta Xi(N) \times hc(N)^2 \times ho(N)^4 + \Delta Xo(N) \times hi(N)^2 \times hc(N)^4 +$$

$$\Delta Xc(N) \times ho(N)^2 \times hi(N)^4 - \Delta Xi(N) \times hc(N)^4 \times ho(N)^2 -$$

$$\Delta Xo(N) \times hi(N)^4 \times hc(N)^2 - \Delta Xc(N) \times ho(N)^4 \times hi(N)^2\} /$$

$$\{hc(N)^2 \times ho(N)^4 + hi(N)^2 \times hc(N)^4 + ho(N)^2 \times hi(N)^4 -$$

$$hc(N)^4 \times ho(N)^2 - hi(N)^4 \times hc(N)^2 - ho(N)^4 \times hi(N)^2\};$$

$$B_{2N} = \{\Delta Xc(N) \times ho(N)^4 + \Delta Xi(N) \times hc(N)^4 +$$

$$\Delta Xo(N) \times hi(N)^4 - \Delta Xo(N) \times hc(N)^4 -$$

$$\Delta Xc(N) \times hi(N)^4 - \Delta Xi(N) \times ho(N)^4\} /$$

$$\{hc(N)^2 \times ho(N)^4 + hi(N)^2 \times hc(N)^4 + ho(N)^2 \times hi(N)^4 -$$

$$hc(N)^4 \times ho(N)^2 - hi(N)^4 \times hc(N)^2 - ho(N)^4 \times hi(N)^2\}; \text{ and}$$

$$B_{4N} = \{\Delta Xo(N) \times hc(N)^2 + \Delta Xc(N) \times hi(N)^2 +$$

$$\Delta Xi(N) \times ho(N)^2 - \Delta Xc(N) \times ho(N)^2 -$$

$$\Delta Xi(N) \times hc(N)^2 - \Delta Xo(N) \times hi(N)^2\} /$$

$$\{hc(N)^2 \times ho(N)^4 + hi(N)^2 \times hc(N)^4 + ho(N)^2 \times hi(N)^4 -$$

$$hc(N)^4 \times ho(N)^2 - hi(N)^4 \times hc(N)^2 - ho(N)^4 \times hi(N)^2\},$$

wherein the reference symbols ΔXi(N), ΔXc(N) and ΔXo(N) represent shift amounts of points of a central edge, a middle point and a peripheral edge of an N-th zone as counted from the optical axis side, and the reference symbols hi(N), hc(N) and ho(N) represent distances from the optical axis to the respective points.

15. The method for designing a diffractive lens according to claim 12, wherein the fourth-order polynomial formula for approximating said microscopic shape including a surface shape of said refractive lens is expressed by following formula:

$$X(h,N) = C_{0N} + C_{2N} h^2 + C_{4N} h^4,$$

where, X is a sag amount with respect to a tangential plane, h is a distance from an optical axis of said diffractive lens, N represents a zone number counted from a zone on a central side, and C0N, C2N and C4N respectively represent 0th-order, second-order and fourth-order coefficients for an N-th zone.

16. The method for designing a diffractive lens according to claim 15, wherein each coefficient defining a diffractive lens approximated by said polynomial formula of the fourth order is determined by following formulae:

$$C_{0N} = \{Xi(N) \times hc(N)^2 \times ho(N)^4 + Xo(N) \times hi(N)^2 \times hc(N)^4 +$$

$$Xc(N) \times ho(N)^2 \times hi(N)^4 - Xi(N) \times hc(N)^4 \times ho(N)^2 -$$

$$Xo(N) \times hi(N)^4 \times hc(N)^2 - Xc(N) \times ho(N)^4 \times hi(N)^2\} /$$

$$\{hc(N)^2 \times ho(N)^4 + hi(N)^2 \times hc(N)^4 + ho(N)^2 \times hi(N)^4 -$$

$$hc(N)^4 \times ho(N)^2 - hi(N)^4 \times hc(N)^2 - ho(N)^4 \times hi(N)^2\};$$

$$C_{2N} = \{Xc(N) \times ho(N)^4 + Xi(N) \times hc(N)^4 +$$

$$Xo(N) \times hi(N)^4 - Xo(N) \times hc(N)^4 -$$

$$Xc(N) \times hi(N)^4 - Xi(N) \times ho(N)^4\} /$$

-continued $$\{hc(N)^2 \times ho(N)^4 + hi(N)^2 \times hc(N)^4 + ho(N)^2 \times hi(N)^4 -$$
$$hc(N)^4 \times ho(N)^2 - hi(N)^4 \times hc(N)^2 - ho(N)^4 \times hi(N)^2\}; \text{ and}$$

$$C_{4N} = \{Xo(N) \times hc(N)^2 + Xc(N) \times hi(N)^2 +$$
$$Xi(N) \times ho(N)^2 - Xc(N) \times ho(N)^2 -$$
$$Xi(N) \times hc(N)^2 - Xo(N) \times hi(N)^2\}/$$
$$\{hc(N)^2 \times ho(N)^4 + hi(N)^2 \times hc(N)^4 + ho(N)^2 \times hi(N)^4 -$$
$$hc(N)^4 \times ho(N)^2 - hi(N)^4 \times hc(N)^2 - ho(N)^4 \times hi(N)^2\},$$

wherein the reference symbol Xi(N), Xc(N) and Xo(N) represent locations, in the direction along the optical axis, of a point at a centeral edge, a middle point, and a peripheral edge of an N-th zone as counted from the optical axis, and the reference symbols hi(N), hc(N) and ho(N) represent distances from the optical axis to respective points.

17. The method for designing a diffractive lens according to claim 3, wherein the optical path difference function has a first approximation formula for determining the boundary point of the zones, and a second approximation formula for determining the shift amount, in the direction along the optical axis, of each zone, the second approximation formula having a higher degree order than the first approximation formula.

18. The method for designing a diffractive lens according to claim 17, wherein the first approximation formula comprises a fourth-order polynomial; and wherein said second approximation formula comprises at least an eighth-order polynomial.

19. The method for designing a diffractive lens according to claim 18, wherein said second approximation formula is a tenth-order polynomial formula.

* * * * *